(12) United States Patent
Norair

(10) Patent No.: US 9,191,340 B2
(45) Date of Patent: Nov. 17, 2015

(54) METHOD AND APPARATUS FOR DYNAMIC MEDIA ACCESS CONTROL IN A MULTIPLE ACCESS SYSTEM

(75) Inventor: John Peter Norair, San Francisco, CA (US)

(73) Assignee: BLACKBIRD TECHNOLOGY HOLDINGS, INC., Dover, DE (US)

( * ) Notice: Subject to any disclaimer, the term of this patent is extended or adjusted under 35 U.S.C. 154(b) by 187 days.

(21) Appl. No.: 13/408,453

(22) Filed: Feb. 29, 2012

(65) Prior Publication Data

US 2012/0224590 A1 Sep. 6, 2012

Related U.S. Application Data

(60) Provisional application No. 61/464,376, filed on Mar. 2, 2011.

(51) Int. Cl.
*H04L 12/413* (2006.01)
*H04L 12/911* (2013.01)
(Continued)

(52) U.S. Cl.
CPC ............ *H04L 47/822* (2013.01); *H04L 1/0061* (2013.01); *H04L 43/0847* (2013.01); *H04L 43/16* (2013.01); *H04L 47/12* (2013.01); *H04W 56/0025* (2013.01); *H04L 1/0083* (2013.01)

(58) Field of Classification Search
CPC .............. H04L 2012/5603; H04L 2012/2841; H04L 2012/5629–2012/5632; H04L 2012/6445–2012/6454; H04L 1/0061; H04L 1/0083; H04W 47/822; H04W 47/12; H04W 56/0025; H04W 43/0847; H04W 43/16
USPC .............. 370/230–234, 312, 389, 445, 310.2, 370/322, 328–330, 337–338, 447–450, 370/459–462; 455/55.31, 434, 443, 448, 455/450–452.1, 509, 515–516
See application file for complete search history.

(56) References Cited

U.S. PATENT DOCUMENTS 5,338,625 A 8/1994 Bates
5,729,557 A 3/1998 Gardner et al.
(Continued)

FOREIGN PATENT DOCUMENTS

EP 1321009 B1 1/2007
JP 2009010449 A * 1/2009
(Continued)

OTHER PUBLICATIONS

PCT Int'l Searching Authority, Notification Concerning Transmittal of the Int'l Search Report and the Written Opinion of the Int'l Searching authority or the Declaration in Int'l application No. PCT/US2012/027386 dated Oct. 16, 2012.
(Continued)

*Primary Examiner* — Charles C Jiang
*Assistant Examiner* — Mohamed Kamara
(74) *Attorney, Agent, or Firm* — McAndrews, Held & Malloy, Ltd.

(57) ABSTRACT

An electronic device may be operable to control access to a physical medium (e.g., airwaves, a copper cable, or an optical fiber) utilizing carrier sense multiple access (CSMA). The amount of time that the electronic device must sense the physical medium as being inactive before it permits transmission of a message onto the physical medium may be determined based on: the size of the message, the type of the message, the symbol rate at which the message is to be transmitted, and/or a channel onto which the message is to be transmitted. Similarly, other aspects of how and when electronic device transmits and/or receives on the physical medium may be controlled via one or more dynamically configurable parameters which may be configured based on characteristics of received and/or to-be-transmitted messages.

28 Claims, 18 Drawing Sheets

(51) Int. Cl.
  *H04L 1/00* (2006.01)
  *H04W 56/00* (2009.01)
  *H04L 12/26* (2006.01)
  *H04L 12/801* (2013.01)

(56) References Cited

U.S. PATENT DOCUMENTS

| | | | |
|---|---|---|---|
| 5,959,281 A | 9/1999 | Domiteaux | |
| 6,115,379 A | 9/2000 | Flanders et al. | |
| 6,307,846 B1 | 10/2001 | Willey | |
| 6,330,700 B1 | 12/2001 | Morris | |
| 6,381,243 B1 | 4/2002 | Ekstedt | |
| 6,388,997 B1 | 5/2002 | Scott | |
| 6,424,301 B1 | 7/2002 | Johnson | |
| 6,452,569 B1 | 9/2002 | Park | |
| 6,665,308 B1 | 12/2003 | Rakib | |
| 6,700,491 B2 | 3/2004 | Shafer | |
| 6,705,531 B1 | 3/2004 | Norton | |
| 6,714,559 B1 | 3/2004 | Meier | |
| 6,771,985 B1 | 8/2004 | Iinuma | |
| 7,233,603 B2* | 6/2007 | Lee | 370/445 |
| 7,280,555 B2 | 10/2007 | Stanforth | |
| 7,305,237 B2 | 12/2007 | Stephens | |
| 7,308,103 B2 | 12/2007 | Corcoran et al. | |
| 7,315,248 B2 | 1/2008 | Egbert | |
| 7,330,446 B2 | 2/2008 | Lee | |
| 7,369,512 B1 | 5/2008 | Shurbanov et al. | |
| 7,580,397 B2* | 8/2009 | Arai et al. | 370/338 |
| 7,606,256 B2 | 10/2009 | Vitebsky | |
| 7,643,509 B2 | 1/2010 | Han et al. | |
| 7,672,284 B2 | 3/2010 | Sugar et al. | |
| 7,689,195 B2 | 3/2010 | Wu | |
| 7,698,463 B2 | 4/2010 | Ogier et al. | |
| 7,735,116 B1 | 6/2010 | Gauvin | |
| 7,760,689 B2 | 7/2010 | Shin | |
| 7,792,955 B2* | 9/2010 | Myojo et al. | 709/224 |
| 7,805,129 B1 | 9/2010 | Issa | |
| 7,814,107 B1 | 10/2010 | Thirumalai et al. | |
| 7,890,839 B2 | 2/2011 | Iwami | |
| 7,962,361 B2 | 6/2011 | Ramchandani | |
| 8,035,488 B2* | 10/2011 | Shiotsu et al. | 340/10.33 |
| 8,036,715 B2 | 10/2011 | Buck | |
| 8,351,409 B2 | 1/2013 | Albert | |
| 8,554,271 B2* | 10/2013 | Wang et al. | 455/553.1 |
| 2002/0025823 A1 | 2/2002 | Hara | |
| 2002/0078045 A1 | 6/2002 | Dutta | |
| 2003/0115369 A1 | 6/2003 | Walter | |
| 2003/0154243 A1 | 8/2003 | Crockett | |
| 2003/0183691 A1 | 10/2003 | Lahteenmaki | |
| 2004/0085993 A1* | 5/2004 | Wentink | 370/447 |
| 2004/0157631 A1 | 8/2004 | Stobart | |
| 2004/0218557 A1 | 11/2004 | Kim et al. | |
| 2005/0078038 A1 | 4/2005 | Takaki | |
| 2005/0083943 A1 | 4/2005 | Lee et al. | |
| 2005/0128086 A1 | 6/2005 | Brown | |
| 2005/0135291 A1 | 6/2005 | Ketchum et al. | |
| 2005/0139685 A1 | 6/2005 | Kozlay | |
| 2005/0174953 A1 | 8/2005 | Ho | |
| 2006/0002312 A1 | 1/2006 | Delattre et al. | |
| 2006/0088021 A1 | 4/2006 | Nelson et al. | |
| 2006/0091223 A1 | 5/2006 | Zellner | |
| 2006/0175420 A1 | 8/2006 | Satou | |
| 2006/0219776 A1 | 10/2006 | Finn | |
| 2006/0220867 A1 | 10/2006 | Dixon | |
| 2007/0000316 A1 | 1/2007 | Lauer | |
| 2007/0010928 A1 | 1/2007 | Brusarosco | |
| 2007/0058661 A1* | 3/2007 | Chow | 370/445 |
| 2007/0083924 A1 | 4/2007 | Lu | |
| 2007/0099641 A1 | 5/2007 | Lastinger | |
| 2007/0125836 A1 | 6/2007 | McAllister et al. | |
| 2007/0136509 A1 | 6/2007 | Agami | |
| 2007/0232281 A1 | 10/2007 | Nakai | |
| 2007/0295074 A1 | 12/2007 | Kobayakawa | |
| 2008/0041936 A1 | 2/2008 | Vawter | |
| 2008/0069097 A1 | 3/2008 | Motegi | |
| 2008/0075123 A1 | 3/2008 | Fourcand | |
| 2008/0107060 A1 | 5/2008 | Andou et al. | |
| 2008/0130597 A1 | 6/2008 | Kalhan | |
| 2008/0164325 A1 | 7/2008 | Borracci | |
| 2008/0172357 A1 | 7/2008 | Rechis | |
| 2008/0186857 A1 | 8/2008 | Becker | |
| 2008/0186867 A1 | 8/2008 | Schoo et al. | |
| 2008/0209322 A1 | 8/2008 | Kaufman | |
| 2008/0228592 A1 | 9/2008 | Kotas | |
| 2008/0238621 A1 | 10/2008 | Rofougaran | |
| 2008/0256409 A1 | 10/2008 | Oran et al. | |
| 2008/0279210 A1* | 11/2008 | Naka et al. | 370/448 |
| 2008/0302177 A1 | 12/2008 | Sinnett | |
| 2008/0320139 A1 | 12/2008 | Fukuda | |
| 2009/0003376 A1 | 1/2009 | Horvat et al. | |
| 2009/0034491 A1 | 2/2009 | Adams | |
| 2009/0055377 A1 | 2/2009 | Hedge | |
| 2009/0069049 A1 | 3/2009 | Jain | |
| 2009/0073070 A1 | 3/2009 | Rofougaran | |
| 2009/0113267 A1 | 4/2009 | Harrison | |
| 2009/0138948 A1 | 5/2009 | Calamera et al. | |
| 2009/0141531 A1 | 6/2009 | Abedin | |
| 2009/0150646 A1 | 6/2009 | Allen | |
| 2009/0171749 A1 | 7/2009 | Laruelle | |
| 2009/0171947 A1 | 7/2009 | Karayel | |
| 2009/0210898 A1 | 8/2009 | Childress et al. | |
| 2009/0251295 A1 | 10/2009 | Norair | |
| 2009/0268674 A1 | 10/2009 | Liu | |
| 2009/0279652 A1 | 11/2009 | Sinha | |
| 2009/0286496 A1 | 11/2009 | Yavuz et al. | |
| 2009/0292418 A1 | 11/2009 | Kuykendal | |
| 2010/0011156 A1 | 1/2010 | Yim | |
| 2010/0026589 A1 | 2/2010 | Dou | |
| 2010/0027558 A1 | 2/2010 | Han | |
| 2010/0052859 A1 | 3/2010 | Lossau | |
| 2010/0078471 A1 | 4/2010 | Lin | |
| 2010/0097946 A1 | 4/2010 | Celentano | |
| 2010/0097956 A1 | 4/2010 | Tauil | |
| 2010/0097957 A1 | 4/2010 | Pirzada et al. | |
| 2010/0118737 A1 | 5/2010 | Kim | |
| 2010/0177696 A1 | 7/2010 | Jung | |
| 2010/0179877 A1 | 7/2010 | Lam | |
| 2010/0181377 A1 | 7/2010 | Chen | |
| 2010/0190437 A1 | 7/2010 | Buhot | |
| 2010/0197261 A1 | 8/2010 | Zibrik et al. | |
| 2010/0228617 A1 | 9/2010 | Ransom et al. | |
| 2010/0232408 A1 | 9/2010 | Lim | |
| 2010/0256976 A1 | 10/2010 | Atsmon | |
| 2010/0280904 A1 | 11/2010 | Ahuja | |
| 2010/0295681 A1 | 11/2010 | Burns et al. | |
| 2010/0303051 A1* | 12/2010 | Umeuchi et al. | 370/338 |
| 2010/0329131 A1* | 12/2010 | Oyman et al. | 370/252 |
| 2011/0003607 A1 | 1/2011 | Forenza et al. | |
| 2011/0007733 A1 | 1/2011 | Kubler et al. | |
| 2011/0064013 A1* | 3/2011 | Liu et al. | 370/312 |
| 2011/0074552 A1 | 3/2011 | Norair | |
| 2011/0112892 A1 | 5/2011 | Tarantino | |
| 2012/0001730 A1 | 1/2012 | Potyrailo | |
| 2012/0086615 A1 | 4/2012 | Norair | |
| 2012/0087267 A1 | 4/2012 | Norair | |
| 2012/0087350 A1 | 4/2012 | Norair | |
| 2012/0088449 A1 | 4/2012 | Norair | |
| 2012/0093151 A1* | 4/2012 | McFarland et al. | 370/389 |
| 2012/0116694 A1 | 5/2012 | Norair | |
| 2012/0116887 A1 | 5/2012 | Norair | |
| 2012/0118952 A1 | 5/2012 | Norair | |
| 2012/0191848 A1 | 7/2012 | Norair | |
| 2012/0191901 A1 | 7/2012 | Norair | |
| 2012/0207141 A1 | 8/2012 | Norair | |
| 2012/0209716 A1 | 8/2012 | Burns | |
| 2012/0224491 A1 | 9/2012 | Norair | |
| 2012/0224530 A1 | 9/2012 | Norair | |
| 2012/0224543 A1 | 9/2012 | Norair | |
| 2012/0225687 A1 | 9/2012 | Norair | |

(56) References Cited

U.S. PATENT DOCUMENTS

| | | |
|---|---|---|
| 2012/0226822 A1 | 9/2012 | Norair |
| 2012/0226955 A1 | 9/2012 | Norair |
| 2013/0017788 A1 | 1/2013 | Norair |

FOREIGN PATENT DOCUMENTS

| | | |
|---|---|---|
| WO | 2006001556 A1 | 1/2006 |
| WO | 2009023592 A2 | 2/2009 |

OTHER PUBLICATIONS

PCT International Searching Authority, Notification Concerning Transmittal of the International Search Report and the Written Opinion of the International Searching Authority, or the Declaration, in International application No. PCT/US2011/55118, dated Feb. 28, 2012. (25 pages).

PCT International Searching Authority, Notification Concerning Transmittal of the International Search Report and the Written Opinion of the International Searching Authority, or the Declaration, in International application No. PCT/US11/55082, dated Mar. 1, 2012 (13 pages).

PCT International Searching Authority, Notification Concerning Transmittal of the International Search Report and the Written Opinion of the International Searching Authority, or the Declaration, in International application No. PCT/US11/55934, dated Mar. 6, 2012 (11 pages).

PCT International Searching Authority, Notification Concerning Transmittal of the International Search Report and the Written Opinion of the International Searching Authority, or the Declaration, in International application No. PCT/US2011/055929, dated Jan. 30, 2012. (15 pages).

PCT International Searching Authority, Notification Concerning Transmittal of the International Search Report and the Written Opinion of the International Searching Authority, or the Declaration, in International application No. PCT/US2011/059292, dated Feb. 2, 2012. (12 pages).

PCT International Searching Authority, Notification Concerning Transmittal of the International Search Report and the Written Opinion of the International Searching Authority, or the Declaration, in International application No. PCT/US11/059304, dated Mar. 9, 2012 (11 pages).

PCT International Searching Authority, Notification Concerning Transmittal of the International Search Report and the Written Opinion of the International Searching Authority, or the Declaration, in International application No. PCT/US2011/060950, dated Mar. 16, 2012. (14 pages).

PCT International Searching Authority, Notification Concerning Transmittal of the International Search Report and the Written Opinion of the International Searching Authority, or the Declaration, in International application No. PCT/US12/22005, dated Mar. 29, 2012. (12 pages).

PCT International Searching Authority, Notification Concerning Transmittal of the International Search Report and the Written Opinion of the International Searching Authority, or the Declaration, in International application No. PCT/US12/22002, dated May 8, 2012. (13 pages).

PCT International Searching Authority, Notification Concerning Transmittal of the International Search Report and the Written Opinion of the International Searching Authority, or the Declaration, in International application No. PCT/US2012/025191 dated May 25, 2012 (8 pages).

PCT International Searching Authority, Notification Concerning Transmittal of the International Search Report and the Written Opinion of the International Searching Authority, or the Declaration, in International application No. PCT/US2012/025197 dated May 25, 2012 (7 pages).

PCT International Searching Authority, Notification Concerning Transmittal of the International Search Report and the Written Opinion of the International Searching Authority, or the Declaration, in International application No. PCT/US2012/027382 dated May 31, 2012 (10 pages).

PCT International Searching Authority, Notification Concerning Transmittal of the International Search Report and the Written Opinion of the International Searching Authority, or the Declaration, in International application No. PCT/US2012/027381 dated May 31, 2012 (13 pages).

PCT International Searching Authority, Notification Concerning Transmittal of the International Search Report and the Written Opinion of the International Searching Authority, or the Declaration, in International application No. PCT/US2012/027387 dated Jun. 6, 2012 (14 pages).

PCT International Searching Authority, Notification Concerning Transmittal of the International Search Report and the Written Opinion of the International Searching Authority, or the Declaration, in International application No. PCT/US2012/27378 dated Jun. 13, 2012 (14 pages).

PCT International Searching Authority, Notification Concerning Transmittal of the International Search Report and the Written Opinion of the International Searching Authority, or the Declaration, in International application No. PCT/US2012/027379 dated Jun. 20, 2012 (16 pages).

PCT International Searching Authority, Notification Concerning Transmittal of the International Search Report and the Written Opinion of the International Searching Authority, or the Declaration, in International application No. PCT/US2012/027384 dated Jun. 20, 2012 (10 pages).

* cited by examiner

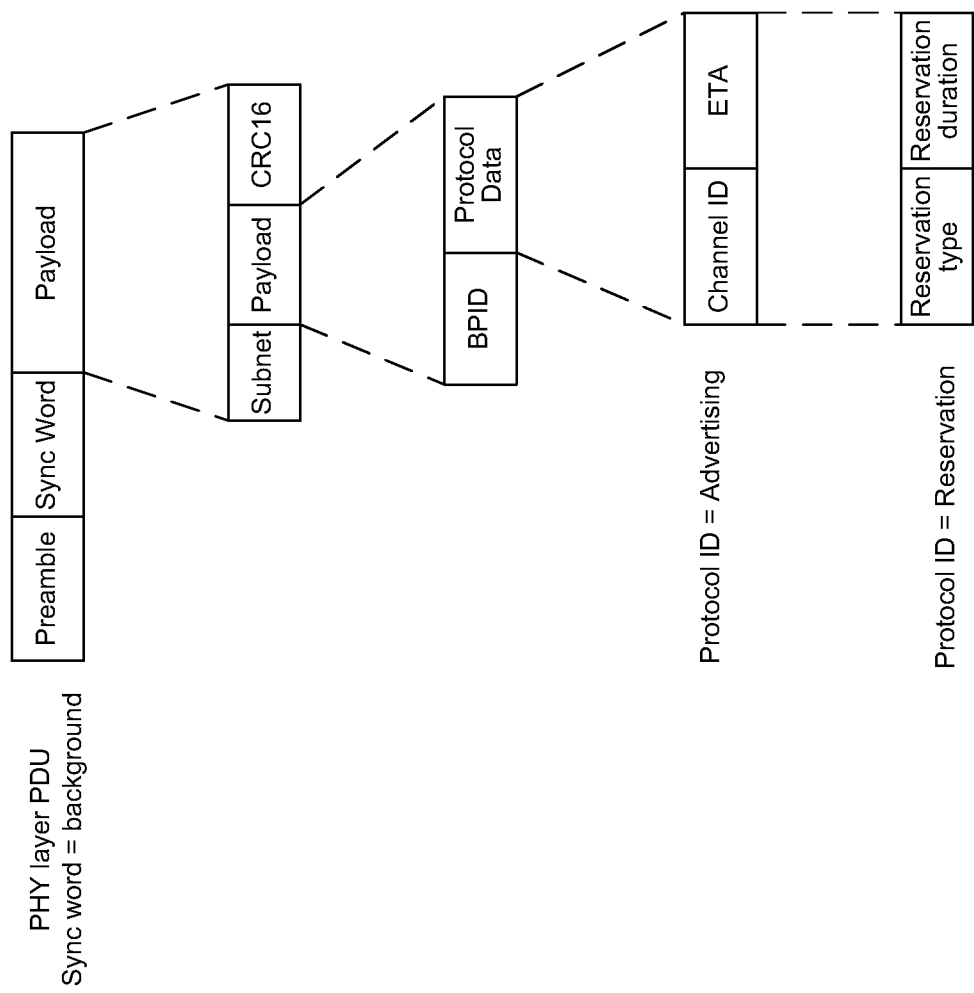

Dialog template: | Response timeout | Response Channel List Length | Response Channel List |

FIG. 14A

Ack template: | No. of Acks | Ack Device IDs |

FIG. 14B

Query template: | Compare Length | Compare Code | Compare Mask | Compare Value |

| Masked | Comparison Type | Comparison Parameters |

FIG. 14C

Error template: | Error Code | Error Subcode | M2QP Error Data | Extended Error Data |

FIG. 14D

Command Data: | Comparison template (FIGs. 15A/B) | Call Template (FIGs. 15C/D) | Return Template (FIGs. 15E/F) | Cmd-Specific Data |

FIG. 14E

| Comparison template, M2QP Opcode = file | Comparison File ID | Comparison Byte Offset |

FIG. 15A

| Comparison template, M2QP Opcode = series | Comparison series ID | Comparison Byte Offset |

FIG. 15B

| Call template, M2QP Opcode = file | Max returned bytes | Return file ID | Return File Entry Offset |

FIG. 15C

| Call template, M2QP Opcode = series | Max returned bytes | Series ID | File Series Data Offset |

FIG. 15D

| Return template, M2QP Opcode = file | Return file ID | File offset | IFSB total length | File data |

FIG. 15E

| Return template, M2QP Opcode = series | Series ID | Series length | File series data offset | File series total data length | File 1 ID | File 1 length | ... | File L ID | File L length | File series data starting at offset |

FIG. 15F

METHOD AND APPARATUS FOR DYNAMIC MEDIA ACCESS CONTROL IN A MULTIPLE ACCESS SYSTEM

CLAIM OF PRIORITY

This patent application makes reference to, claims priority to and claims benefit from U.S. Provisional Patent Application Ser. No. 61/464,376 entitled "Advanced Communication System for Wide-area Low Power Wireless Applications and Active RFID" and filed on Mar. 2, 2011.

The above-referenced application is hereby incorporated herein by reference in its entirety.

INCORPORATION BY REFERENCE

This patent application also makes reference to:
U.S. Provisional Patent Application Ser. No. 61/464,376 titled "Advanced Communication System for Wide-Area Low Power Wireless Applications and Active RFID" and filed on Mar. 2, 2011;
U.S. Provisional Patent Application Ser. No. 61/572,390 titled "System for Adding Dash7-Based Applications Capability to a Smartphone" and filed on Jul. 15, 2011;
U.S. patent application Ser. No. 13/267,640 titled "Method and Apparatus for Adaptive Searching of Distributed Datasets," filed on Oct. 6, 2011, and now published as US2012/0087267;
U.S. patent application Ser. No. 13/267,621 titled "Method and Apparatus for Low-Power, Long-Range Networking" and filed on Oct. 6, 2011;
U.S. patent application Ser. No. 13/270,802 titled "Method and Apparatus for a Multi-band, Multi-mode Smartcard" and filed on Oct. 11, 2011;
U.S. patent application Ser. No. 13/270,959 titled "Method and Apparatus for an Integrated Antenna" and filed on Oct. 11, 2011;
U.S. patent application Ser. No. 13/289,054 titled "Method and Apparatus for Electronic Payment" and filed on Nov. 4, 2011;
U.S. patent application Ser. No. 13/289,050 filed on Nov. 4, 2011;
U.S. patent application Ser. No. 13/297,348 titled "Method and Apparatus for Interfacing with a Smartcard" and filed on Nov. 16, 2011;
U.S. patent application Ser. No. 13/354,513 titled "Method and Apparatus for Memory Management" and filed on Jan. 20, 2012;
U.S. patent application Ser. No. 13/354,615 titled "Method and Apparatus for Discovering, People, Products, and/or Services via a Localized Wireless Network" and filed on Jan. 20, 2012;
U.S. patent application Ser. No. 13/396,708 titled "Method and apparatus for Plug and Play, Networkable ISO 18000-7 Connectivity" and filed on Feb. 15, 2012;
U.S. patent application Ser. No. 13/396,739 titled "Method and Apparatus for Serving Advertisements in a Low-Power Wireless Network" and filed on Feb. 15, 2012;
U.S. patent application Ser. No. 13/408,440 titled "Method and Apparatus for Forward Error Correction (FEC) in a Resource-Constrained Network" and filed on Feb. 29, 2012;
U.S patent application Ser. No. 13/408,447 titled "Method and Apparatus for Adaptive Traffic Management in a Resource-Constrained Network" and filed on Feb. 29, 2012;
U.S. patent application Ser. No. 13/408,457 titled "Method and Apparatus for Rapid Group Synchronization" and filed on Feb. 29, 2012;
U.S. patent application Ser. No. 13/408,461 titled "Method and Apparatus for Addressing in a Resource-Constrained Network" and filed on Feb. 29, 2012;
U.S. patent application Ser. No. 13/408,464 titled "Method and Apparatus for Query-Based Congestion Control" and filed on Feb. 29, 2012; and
U.S. patent application Ser. No. 13/408,466 titled "Method and Apparatus for Power Autoscaling in a Resource-Constrained Network" and filed on Feb. 29, 2012.

Each of the above-referenced applications is hereby incorporated herein by reference in its entirety.

FIELD OF THE INVENTION

Certain embodiments of the invention relate to networking. More specifically, certain embodiments of the invention relate to a method and apparatus for dynamic media access control in a multiple access system.

BACKGROUND OF THE INVENTION

Existing methods of media access control for a shared communication medium are often inefficient. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for dynamic media access control in a multiple access system, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

FIG. 11A illustrates the structure of an exemplary physical layer frame containing a first type of data link layer protocol data unit (PDU).

FIGS. 14A-14E depict the structure of exemplary portions of a transport-layer PDU.

FIGS. 15A-15F depict the structure of exemplary portions of a transport-layer PDU.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the terms "e.g.," and "for example," introduce a list of one or more non-limiting examples, instances, or illustrations.

Figure 1:
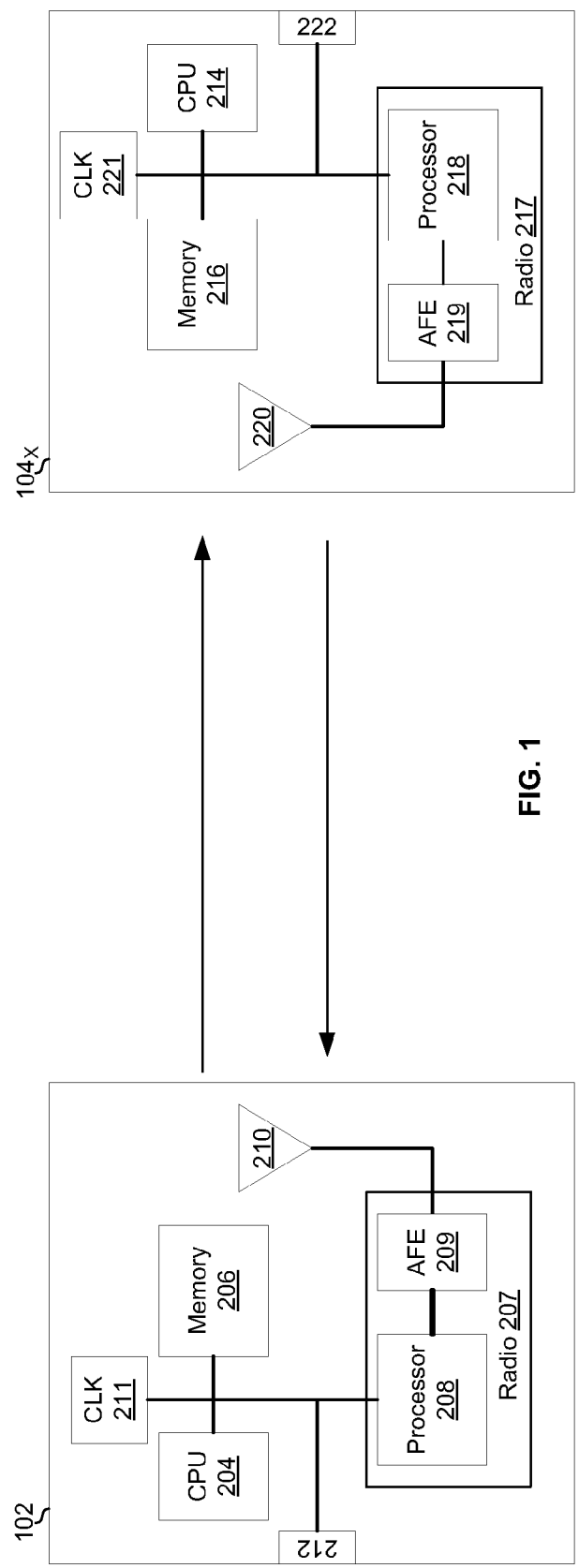
FIG. 1 depicts exemplary communication devices which may comprise a dynamically adaptable media access controller.

FIG. 1 depicts exemplary communication devices which may comprise a dynamically adaptable media access controller. Shown in FIG. 1 are details of an exemplary first device 102 and details of an exemplary second device 104.

The CPU 204 may comprise circuitry operable to control operation of the first device 102. The CPU 204 may, for example, execute an operating system and/or other programs such (e.g., programs that enable a user interface of the device 102). The CPU 204 may generate one or more control signals for controlling the operation of the device 102. The CPU 204 may, for example, control a mode of operation of the device 102.

The CPU 214 may comprise circuitry operable to control operation of the second device 104. In some instances, the CPU 214 may be substantially similar to the CPU 204. In instances that the device 102 is less resource-constrained device, such as a base station or network controller, and the device 104 is more resource-constrained device, such as a battery-powered tag or a smartcard as described in above-incorporated U.S. patent application having Ser. No. 13/270,802, the CPU 204 may be less-complex (e.g., comprise fewer gates, utilize less power, utilize less memory, etc.) than the CPU 214. In one embodiment, for example, the CPU 204 may comprise a RISC or ARM processor, and the CPU 214 may comprise a state-machine having a relatively small number of states (e.g., four states).

The radio 207 may comprise a processor 208 and an analog front-end (AFE) 209. The processor 208 may comprise circuitry operable to interface with the AFE 209 to receive and transmit data, and to process received and to-be-transmitted data. For transmission, the processor 208 may be operable to receive data from the CPU 204 and/or memory 206, encode, packetize, and/or otherwise process the data to prepare it for transmission in accordance with one or more wireless protocols, and output the data to the AFE 209 for transmission. For reception, the processor 208 may be operable to receive data via the AFE 209, process the received data and output received data to the memory 206 and/or the CPU 204. Exemplary protocols which may be supported by the second device 104 include the ISO 18000-7 standard, and protocols described in the above-incorporated U.S. Provisional Patent Application having Ser. No. 61/464,376 filed on Mar. 2, 2011.

The radio 217 may comprise a processor 218 and an analog front-end (AFE) 219. The baseband processor 218 may comprise circuitry operable to interface with the AFE 219 to receive and transmit data, and to process received and to-be-transmitted data. In some instances, the baseband processor 218 may be substantially similar to the baseband processor 208. In instances that the device 102 is less-resource-constrained device, such as a base station or network controller, and the device 104 is a more-resource-constrained device, such as a battery-powered tag, the baseband processor 218 may be less-complex (e.g., comprise fewer gates, utilize less power, utilize less memory, etc.) than the baseband processor 208. In one embodiment, for example, the baseband processor 208 may be operable to implement more complex signal processing algorithms (e.g., FEC decoding) than the baseband processor 218.

The analog front-end (AFE) 209 may comprise circuitry suitable for processing received and/or to-be-transmitted data in the analog domain. For transmission, the AFE 209 may receive digital data from the baseband processor 208, process the data to generate corresponding RF signals, and output the RF signals to the antenna 210. For reception, the AFE 209 may receive RF signals from the antenna 210, process the RF signals to generate corresponding digital data, and output the digital data to the baseband processor 209. In some instances, the AFE 219 may be substantially similar to the AFE 209. In instances that the device 102 is less-resource-constrained device, such as a base station or network controller, and the device 104 is a more-resource-constrained device, such as a battery-powered tag, the AFE 219 may be less-complex (e.g., comprise fewer gates, utilize less power, utilize less memory, etc.) than the AFE 209. In one embodiment, for example, the AFE 209 may comprise a more-sensitive receiver, a more powerful transmitter than the AFE 219.

Circuitry of the memory 206 may comprise one or more memory cells and may be operable to store data to the memory cell(s) and read data from the memory cell(s). The one or more memory cell may comprise one or more volatile memory cells and/or one or more non-volatile memory cells. The memory 206 may store data arranged, for example, as an indexed short file block (ISFB) and/or indexed short file series block (ISFSB) as described in the above-incorporated U.S. Provisional Patent Application having Ser. No. 61/464,376.

Circuitry of the memory 216 may comprise one or more memory cells and may be operable to read data from the memory cell(s) and/or store data to the memory cell(s). The memory 216 may store data arranged, for example, as an indexed short file block (ISFB) and/or indexed short file series block (ISFSB) as described in the above-incorporated U.S. Provisional Patent Application having Ser. No. 61/464, 376. In some instances, the memory 216 may be substantially similar to the memory 206. In instances that the device 104 is resource-constrained, the memory 216 may be less-complex (e.g., comprise fewer gates, utilize less power, etc.) than the memory 206.

Each of the clocks 211 and 221 may be operable to generate one or more oscillating signals which may be utilized to control synchronous circuitry of the device 100. Each of the clocks 211 and 221 may comprise, for example, one or more crystal oscillators, phase-locked loops, and/or direct digital synthesizers. Each of the clocks 211 and 221 may also comprise a "date/time" or "real-time" clock operable to keep track of time of day, day of week, day of month, month, and/or year.

The interfaces 212 and 222 may enable configuring and/or programming the devices 102 and 104, respectively. In an exemplary embodiment, one or more values of one or more timing parameters may be programmed via the programming interfaces 212 and/or 222.

Each of the antennas 210 and 220 may be operable to transmit and receive electromagnetic signals in one or more frequency bands. In an embodiment of the invention, the antennas 210 and 220 may be operable to transmit and receive signals in the ISM frequency band centered at 433.92 MHz.

In operation, the device 102 may be, for example, a base station or network controller, and the device 104 may be a mobile device such as a smart phone or a smartcard. The devices 102 and 104 may communicate via the radios 207 and 217. In communicating over the physical medium (e.g., the airwaves for wireless communication or a cable for wired communication), values of one or more media access control (MAC) parameters that control when and/or how to access the physical medium may be dynamic (i.e., configured "real-time" or "on-the-fly"). For example, values of one or more MAC parameters may be changed on a per-message and/or per-dialog (an exchange of one or more logically-related messages) basis. Exemplary MAC parameters whose values may be dynamically determined include: which channel(s) to transmit and/or receive on, whether to utilize CSMA, how long to listen before transmitting, how long to listen after transmitting, and/or how long a channel must be free before transmitting on that channel. Parameter values may, for example, change based on the contents of a message received over the medium and/or based on instructions stored locally (e.g., in memory 216 for the device 104). Such instructions may, for example, be generated by an application and/or operating system running on the device 102 and/or 104.

Figure 2:
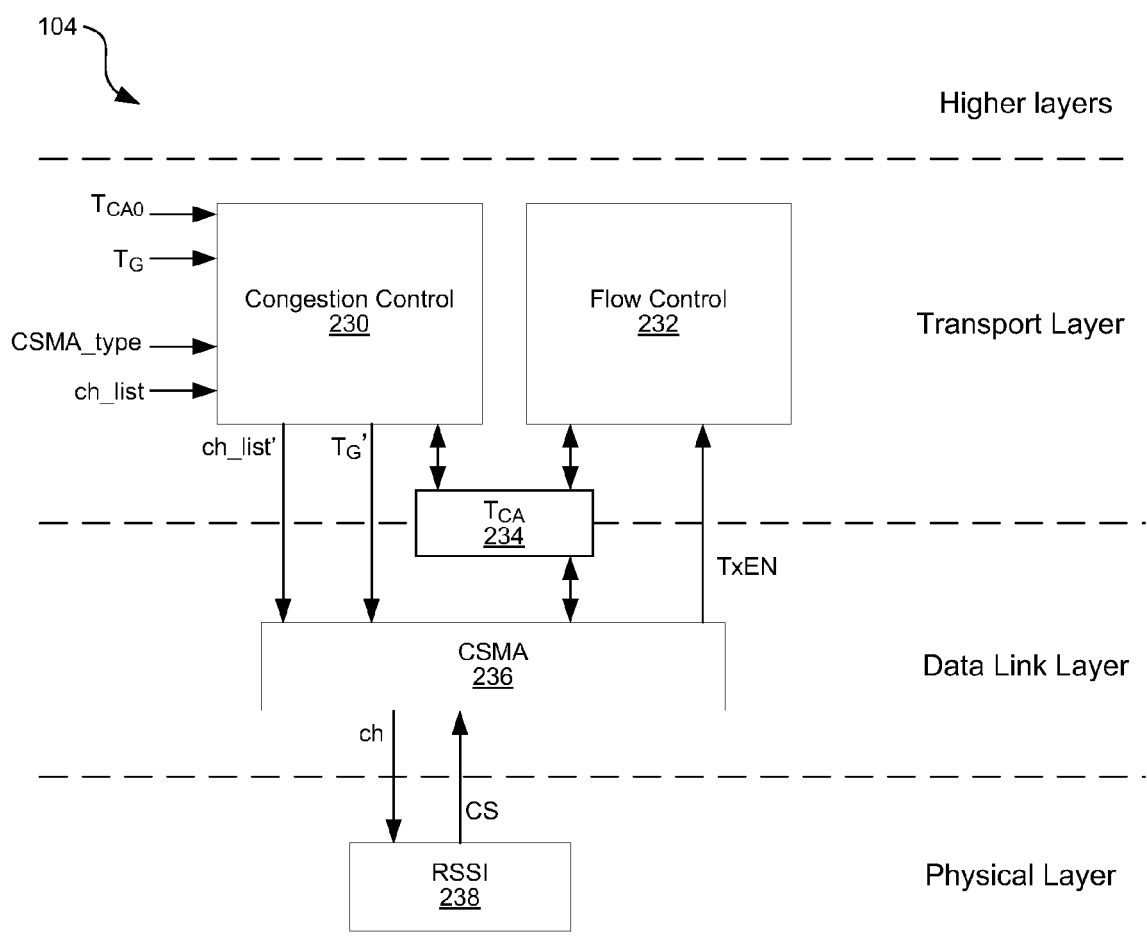
FIG. 2 is a diagram illustrating aspects of the invention taking place at different layers of the OSI model.

FIG. 2 is a diagram illustrating aspects of the invention taking place at different layers of the OSI model. As shown in FIG. 2, the device 104 may comprise: a congestion module 230 and/or a flow control module 232 which may operate at the transport layer (layer 4 of the OSI model); a carrier sense multiple access (CSMA) module 236 which may operate at the data link layer (layer 2 of the OSI model); and a received signal strength indicator (RSSI) module which may operate at the physical layer (layer 1 of the OSI model). The device 104 may also comprise a register 234 which may be readable and/or modifiable by the congestion control module 230, the flow control module 232, and/or the CSMA module 236.

In operation, the device 104 may receive a request message and decide to transmit a response message in reply to the request message. For the transmission of the response message, the congestion control module 230 may receive a parameter $T_{CA0}$, a parameter $T_G$, a parameter CSMA_options, and a parameter ch_list. The parameters may be utilized directly in controlling access to the physical medium and/or utilized for determining values of other parameters which, in turn, may be utilized in controlling access to the physical medium. One or more of the parameters may have been received in, and/or derived from, information contained in the received request message. In this manner, the requesting device may control, at least in part, if, how, and/or when the responding device 104 transmits a response to the request.

The parameter ch_list may comprise a list of channel identifiers, where each channel identifier is uniquely associated with a particular combination of center frequency and bandwidth. The list of channels may correspond to channels on which the requesting device (i.e., the device that sent the request message) will listen for responses. The congestion control module 230 may modify the parameter ch_list to generate ch_list' which may then be passed onto the CSMA module 236. The modification of ch_list to generate ch_list' may be, for example, to remove one or more channels from the list because the device 104 is aware that the removed channel is highly congested, the device 104 does not support the channel, and/or for some other reason.

The parameter $T_{CA0}$ may correspond to the amount of time that the device 104 has to begin transmitting the response message onto the physical medium. In an exemplary embodiment, $T_{CA0}$ may correspond to $T_C - T_{resp}$, where the value of $T_C$ ("contention period" or "response timeout") is the amount of time that the requesting device is going to listen for responses to the request message ($T_C$ may have been received in the request message), and $T_{resp}$ is the amount of time it will take the device 104 to transmit the response message.

The parameter CSMA_options may indicate whether to utilize carrier sense (i.e., whether to "listen before talk") and/or which equations and/or algorithms the device 104 should utilize for calculating values for one or more timing parameters utilized by the CSMA module 236 and/or the congestion control module 230. Two exemplary parameters which may be calculated are $T_G'$ ("guard time) and $T_{CA}$ ("collision avoidance timeout"). To illustrate, in an exemplary embodiment, $T_{CA}$ may be set equal to $T_{CA0}$ for a first value of CSMA_options, but $T_{CA}$ may be set equal to $T_{CA0}/2$ for a second CSMA_options. Other factors may additionally or alternatively be used for calculating $T_{CA}$. Such factors may comprise, for example, characteristics (e.g., type and/or length) of the response message, and/or characteristics (e.g., data rate, frequency, bandwidth, modulation type, and/or symbol rate) of the channel onto which the response message is to be transmitted. After calculating $T_{CA}$, the congestion control module 230 may store the value of $T_{CA}$ in the register 234.

The parameter $T_G$ may be an initial value for a parameter $T_G'$ ("guard time"). $T_G'$ which may determine how long the device 104 must sense the physical medium as being inactive before the device 104 begins transmitting the response message onto the physical medium. Other factors in determining a value of $T_G'$ may include CSMA_options, $T_{CA}$, $T_{CA0}$, characteristics (e.g., type and/or length) of the response message, and/or characteristics (e.g., data rate, frequency, bandwidth, modulation type, and/or symbol rate) of the channel onto which the response message is to be transmitted.

Upon initialization from the congestion control module 230, the CSMA module 236 may perform CSMA as, for example, described below in reference to FIG. 3C. If an available channel is detected, the CSMA module 236 may assert TxEN and the flow control module 232 may then manage the transmission of the response packet onto the medium on the available channel. Upon TxEN being asserted, the flow control module 232 may modify the value stored in the register 234. If, after trying for a period of time equal to $T_{CA}$, none of the channels in the channel list are determined to be available, then, depending on the value of $T_{CA}$, the device 104 may abort transmission of the response or may take a break and try again later. For example, if the congestion control module sets $T_{CA}=T_{CA0}$ then upon the CSMA failing to obtain access to the medium for a period of time $T_{CA}$, the device 104 may abort transmission of the response message. Conversely, if $T_{CA}<T_{CA0}$, then the congestion control module 230 may wait for a period of time $T_{wait}$, and then trigger the CSMA module 236 to once again attempt to gain access to the medium. The second attempt may last for up to a period of time equal to $T_{CA0}-T_{CA}-T_{wait}$. Factors in determining a value of $T_{wait}$ may include CSMA_options, $T_{CA}$, $T_{CA0}$, characteristics (e.g., type and/or length) of the response message, and/or characteristics (e.g., data rate, frequency, bandwidth, modulation type, and/or symbol rate) of the channel onto which the response message is to be transmitted.

Figure 3A:
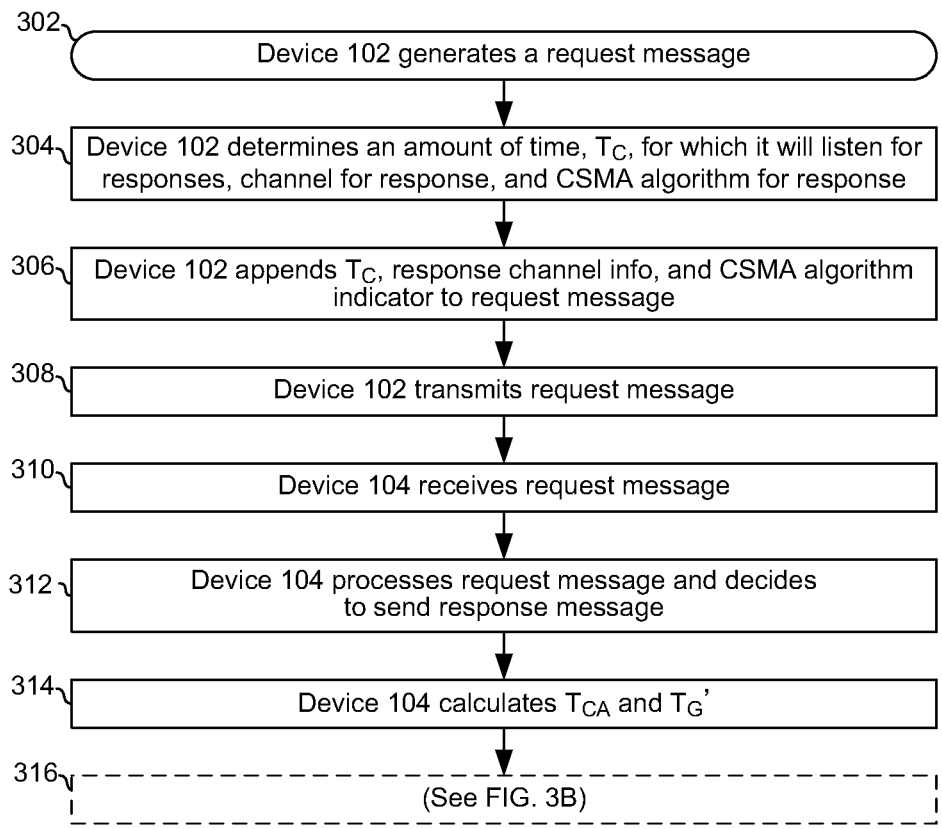
FIGS. 3A-3C are a flowchart illustrating the use of dynamic CSMA for communicating over a shared physical medium.
Figure 3B:
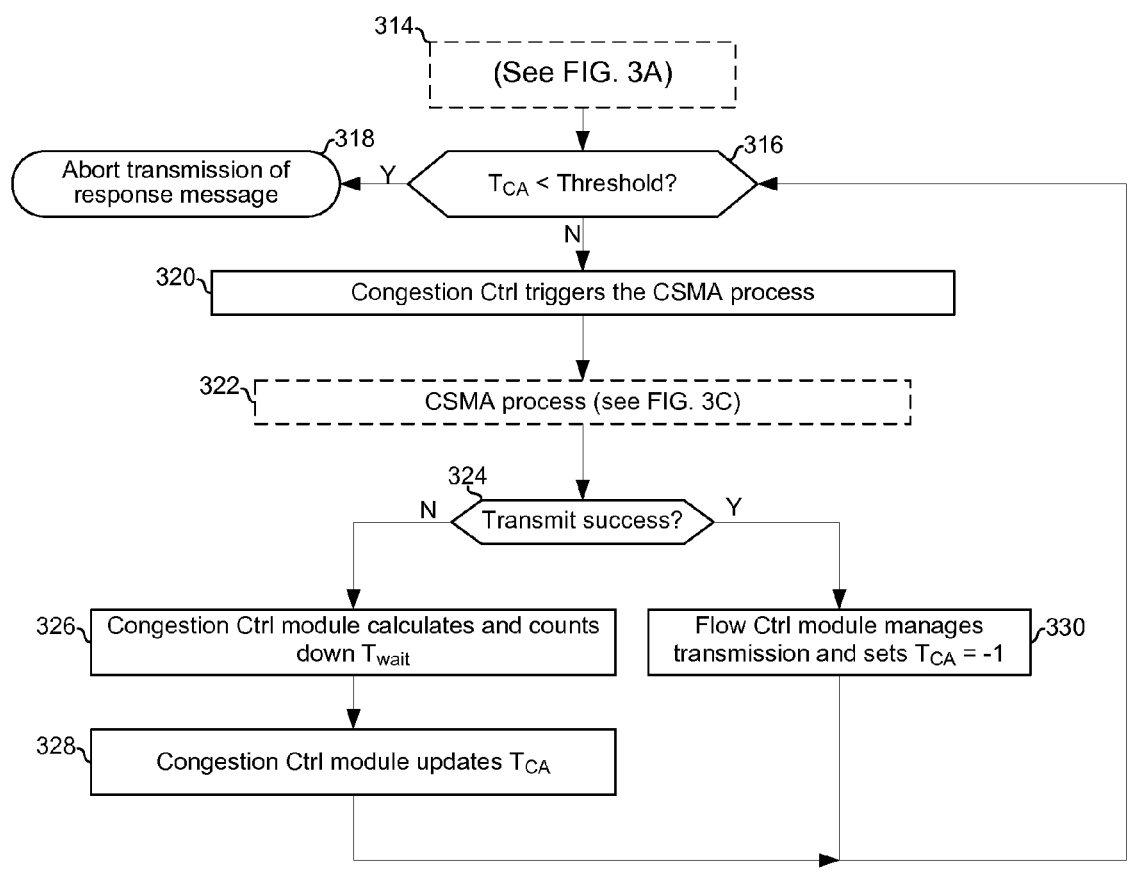
Figure 3C:
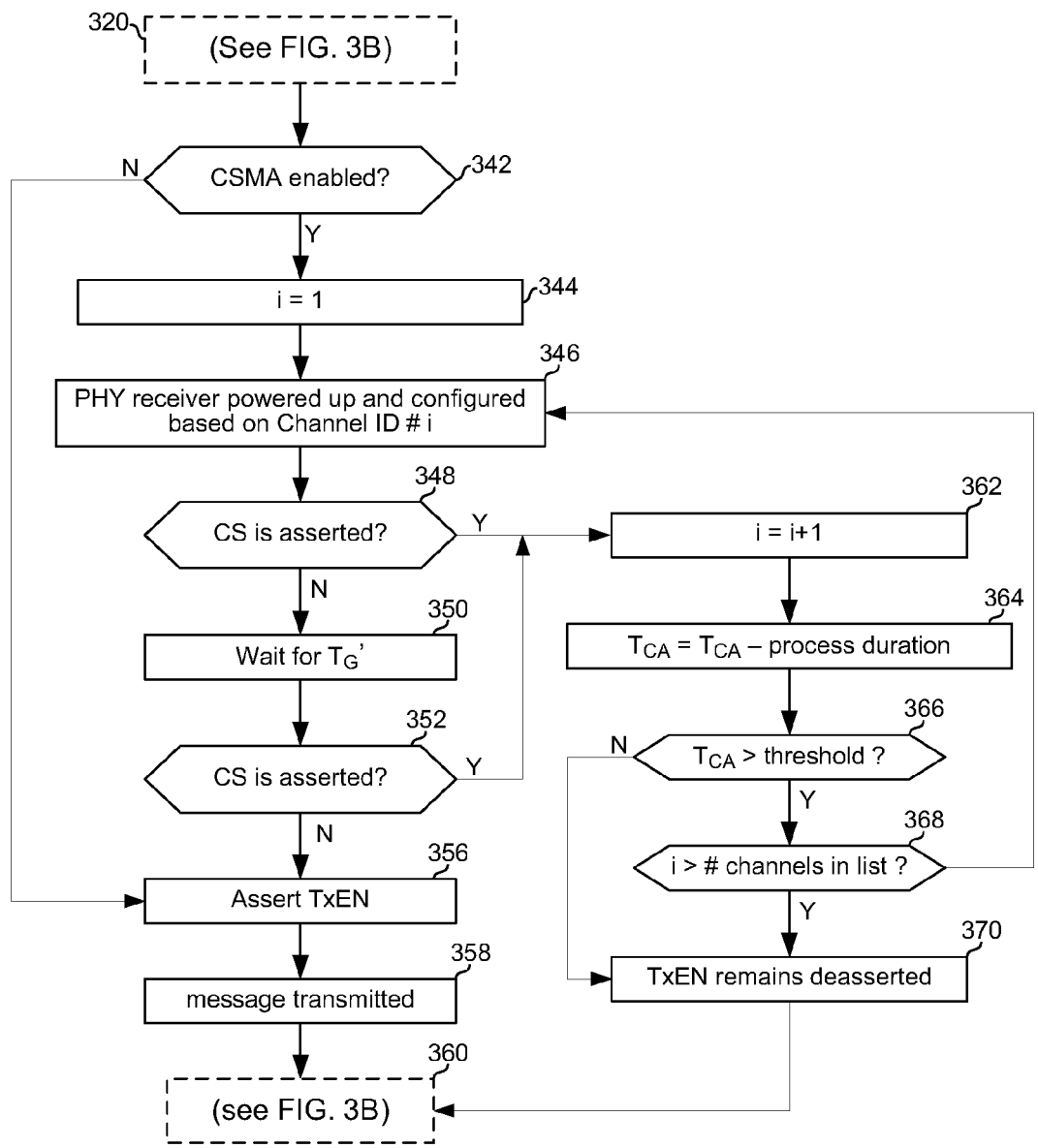

FIGS. 3A-3C are a flowchart illustrating the use of dynamic CSMA for communicating over a shared physical medium. Referring to FIG. 3A, the exemplary steps begin with step 302 in which the device 102 generates a request message. The message may, for example, comprise a query template and seek responses from devices which possess certain characteristics and/or store certain data.

In step 304, the device 102 determines a value of one or more parameters that instruct devices receiving the request as to if, how, and/or when to send responses to the request message. For example, the device 102 may determine a value of $T_C$ (the amount of time it will listen for responses to the request), CSMA_options (a flag which indicates an equation and/or algorithm that responding devices should use when calculating values for certain timing parameters), and a list of one or more channels on which the device 102 will listen for responses. The device 102 may determine $T_C$, CSMA_options, and/or the channel list based on, for example: the type of request, the symbol rate of the channel(s) over which the request will be transmitted and/or responses received, the results of past requests (e.g., knowledge about the devices that have responded to past requests), the location of the device 102 (e.g., based on received GPS signals, other wireless signals, and/or user input), the number or responses that are desired, and/or any other suitable criteria. For example, the device 102 may set $T_C$ to a larger value if it wants to receive many and/or long responses, and may set $T_C$ to a smaller value if it wants to receiver fewer and/or shorter responses.

In step 306, the device 102 inserts the value(s) of the one or more parameters calculated in step 304 into one or more fields of the request message. In step 308, the device 102 transmits the request message. In an exemplary embodiment, the device 102 may perform CSMA and transmit the request message only upon sensing that the medium is free. In such instances, timing parameters utilized as part of the CSMA process may be the same as the values calculated for the potential response messages, or may be different. For example, first values of timing parameters, such as $T_{CA}$ and $T_G'$, may be utilized when transmitting request messages whereas second values of timing parameters, such as $T_{CA}$ and $T_G'$, may be utilized when transmitting response messages. In another exemplary embodiment, for request messages, the device 102 may not sense whether another device is already transmitting because, for example, it may not care whether a collision occurs or may know (e.g., through scheduling) that the medium is free.

In step 310, the request message is received by the device 104. In step 312, the device 104 processes the received request message and decides to transmit a response message. In step 314, the device 104 determine values of $T_{CA}$ and $T_G'$ to be utilized for transmitting the response message. The value of $T_{CA}$ for the response message may be calculated, for example, as described above with respect to FIG. 2. The value of $T_G'$ for the response message be calculated as, for example, described below with respect to FIGS. 5A-5C.

Referring now to FIG. 3B, in step 316 it is determined whether the value of $T_{CA}$ calculated in step 314 is compared to a threshold. If the value of $T_{CA}$ is less than a threshold (i.e., the requesting device will cease listening before the complete response message can be transmitted) then in step 318, the device 104 aborts transmission of the response message.

Returning to step 316, if the value of $T_{CA}$ is greater than the threshold, then, in step 320, the congestion control module 230 triggers the CSMA process performed by the CSMA module 236. In step 322, the CSMA process described below with respect to FIG. 3C takes place. In step 324, if transmission was successful (i.e., either CSMA was disabled or an available channel for transmitting the response message was detected during step 322), then the exemplary steps advance to step 330. In step 330, the flow control module 232 sets the $T_{CA}$ register 234 to a value guaranteed to be less than the threshold utilized in step 316. For example, the flow control module 232 may set the $T_{CA}$ register 234 to a value of −1.

Returning to step 324, if the step 322 did not result in a successful transmission, then the exemplary steps advance to step 326. In step 326, the congestion control module counts down an amount of time $T_{wait}$. The value of $T_{wait}$ may be calculated based on variety of factors such as, for example, CSMA_options, $T_{CA0}$, $T_{CA}$, $T_G'$, the length of the response message, the type (e.g., foreground or background) of the response message, the symbol rate at which the response message is to be transmitted, and/or a search score generated by comparing a received search token with locally stored data.

In step 328, the value stored in the $T_{CA}$ register 234 is updated. In an exemplary embodiment, the value stored in the register 234 may be updated by subtracting off the amount of time that has elapsed since the value was calculated. In another exemplary embodiment, a new value of $T_{CA}$ may be calculated based on, for example, CSMA_options, $T_G'$, and/or on how much time is left in the contention period (the time period of duration $T_C$ during which the requesting device will listen for responses).

Referring now to FIG. 3C, in step 342, if CSMA is disabled (i.e., the device 104 is configured to transmit onto the medium without first sensing whether another device is currently transmitting) then the steps advance to step 356. In step 356, the CSMA module 236 asserts TxEN. In step 358 the message is transmitted by the flow control module 232.

Returning to step 342, if CSMA is enabled, then in step 344, a variable i is set to 1. In step 346, the physical layer receiver of the device 104 is powered-up and configured to receive on the $i^{th}$ channel identified by the parameter ch_list'. In step 348, the CSMA module 236 detects whether CS from the physical layer is asserted. The PHY may assert CS when the received signal strength is above a threshold. The threshold utilized by the RSSI module 238 may have been preconfigured by an administrator and/or configured dynamically based on, for example, past performance and/or based on information contained in the received request message. If CS is not asserted, then in step 350, the CSMA module 236 waits for a period of time equal to $T_G'$. In step 352, the CSMA module 236 again detects whether CS from the physical layer is asserted. If CS is not asserted then, in step 356 the CSMA module 236 asserts TxEN. In step 358 the flow control module 232 manages the transmission of the response message onto the physical medium.

Returning to steps 348 and 352, if either of these steps detect that CS is asserted, then the exemplary steps advance to step 362. In step 362, the variable i is incremented by 1. In step 364, the value of $T_{CA}$ in register 236 is updated by subtracting off the amount of time that has elapsed since the register was last programmed. In step 366, the updated value of $T_{CA}$ is compared to a threshold (i.e. it is determined whether there would still be time to transmit the response message before the contention period ends). If not, then in step 370, TxEN remains deasserted and the steps advance to step 360. If so, then in step 368 it is determined whether all channels in the channel list have been checked for availability. If not, then the exemplary steps return to step 346. If all channels have been checked, then the exemplary steps advance to step 370.

Figure 4A:
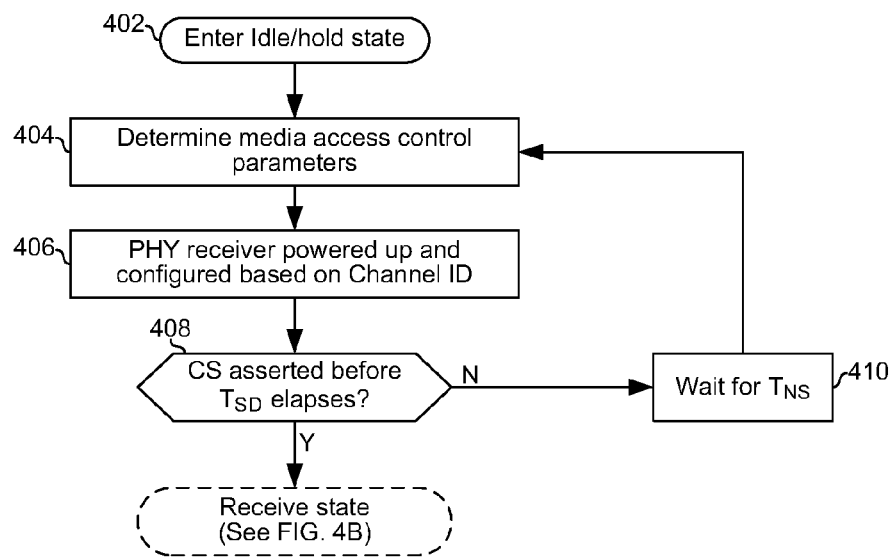
FIG. 4A is a flowchart illustrating hold-state or idle-state operation of an electronic device.

FIG. 4A is a flowchart illustrating hold-state or idle-state operation of an electronic device. The exemplary steps begin with step 402 when the device 104 enters an idle or hold state of operation. In step 404, the device 104 determines values of one or more MAC parameters such as, for example, Channel ID, scan duration ($T_{SD}$), and time-to-next-scan ($T_{NS}$). In step 406, upon the triggering of a scan (e.g., based on a value of $T_{NS}$ and/or a real-time clock) a physical layer receiver of the device 104 is powered-up and configured to listen on the channel indicated by the value of Channel ID determined in step 404. In step 408, if the device listens for $T_{SD}$ without CS being asserted, then the exemplary steps advance to step 410. In step 410, the device 104 waits an amount of time equal to $T_{NS}$ before returning to step 404. On the other hand, in step 408, if CS is asserted before $T_{SD}$ times out, then the device 104 may transition to a receive state of operation as, for example, described with respect to FIG. 4B.

Figure 4B:
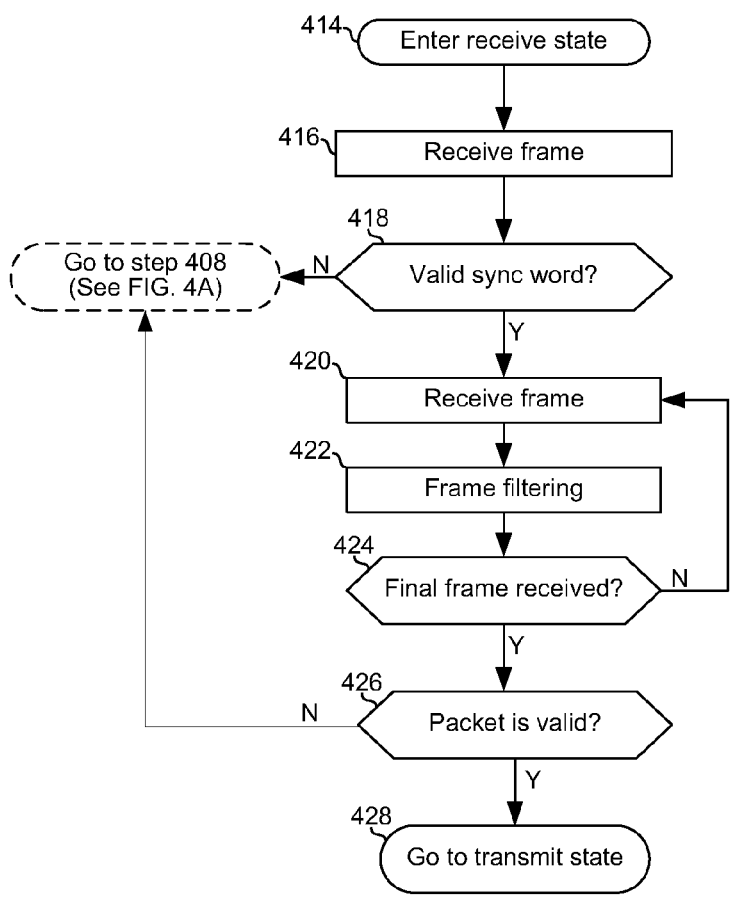
FIG. 4B is a flowchart illustrating receive-state operation of an electronic device.

FIG. 4B is a flowchart illustrating receive-state operation of an electronic device. The steps begin with step 414 when the device 104 enters a receive state of operation. In step 416 the device may receive a number of bits which may constitute all or part of a frame. In step 418, the device 104 may compare at least a portion of the received bits to one or more known values. The result of the comparison may indicate whether the bits received in step 418 were part of a valid frame and, if so, the type of frame. For example, a valid frame may begin with a plurality of bits that constitute a sync word. Accordingly, the device 104 may compare the initial plurality of bits to one or more known-good values of the sync word. If the initial plurality of bits is not a valid sync word, then the received bits may be discarded and the device returns to an idle or hold state of operation. If the initial plurality of bits is a valid sync word, then the exemplary steps advance to step 420.

In step 420, the device may receive any remaining bits of the frame. In step 422, the device 104 may parse one or more fields of the received frame to determine whether the device 104 was an intended recipient of the frame and/or whether the device 104 cares about the frame (i.e., wants to devote resources to further processing the message). Frames not intended for the device 104 and/or not of interest to the device 104 may be discarded without further processing. In step 424, if there are additional frames to be received then the steps may return to step 420. If there are no additional frames to receive then in step 426 the device 104 may determine whether the received packet passes (i.e. is not dropped during) MAC filtering. If not, then the device 104 may return to step 408 in which it may re-evaluate $T_{SD}$ and reinitialize reception. If so, then the device 104 may transition to a transmit state (e.g., as described in portions of FIGS. 4A-4C).

Figure 5A:
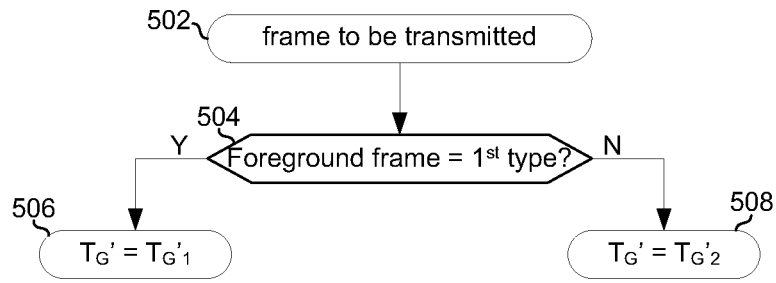
FIG. 5A is a flowchart illustrating the determination of guard time for a CSMA process based on a type of message to be transmitted.

FIG. 5A is a flowchart illustrating the determination of guard time for a CSMA process based on a type of message to be transmitted. The exemplary steps begin with step 502 when the device 104 has a frame to transmit. In step 504 the device 104 may determine whether the frame to be transmitted is a first type of frame (e.g., a foreground frame) or a second type of frame (e.g., a background frame). If the frame is of the first type, then in step 506 $T_G'$ may be set to a first value. If the frame is of the first type, then in step 506 $T_G'$ may be set to a second value, which may be higher than the first value.

Figure 5B:
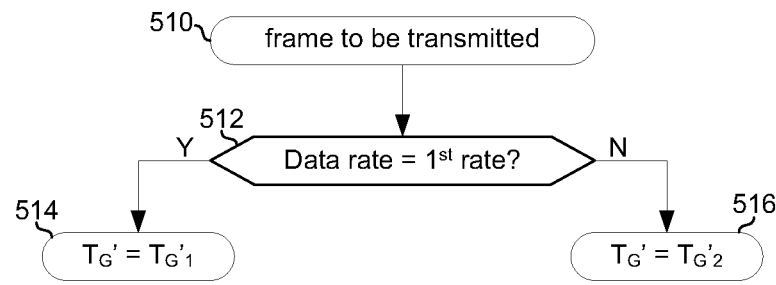
FIG. 5B is a flowchart illustrating the determination of guard time for a CSMA process based on a rate at which a message is to be transmitted.

FIG. 5B is a flowchart illustrating the determination of guard time for a CSMA process based on a symbol rate at which a message is to be transmitted. The exemplary steps begin with step 510 when the device 104 has a frame to transmit. In step 512 the device 104 may determine whether the frame to be transmitted at a first symbol rate (e.g., 200 kS/s) or at a second symbol rate (e.g., 55.55 kS/s). If the frame is to be transmitted at the first symbol rate, then, in step 514, $T_G'$ may be set to a first value. If the frame is to be transmitted at the second symbol rate, then in step 506 $T_G'$ may be set to a second value, which may be higher than the first value.

Figure 5C:
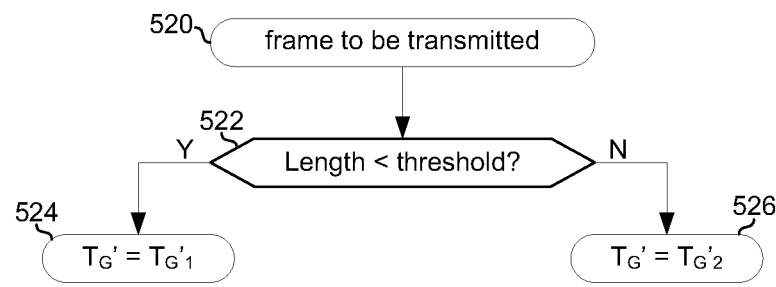
FIG. 5C is a flowchart illustrating the determination of guard time for a CSMA process based on a length of a message to be transmitted.

FIG. 5C is a flowchart illustrating the determination of guard time for a CSMA process based on a length of a message to be transmitted. The exemplary steps begin with step 520 when the device 104 has a frame to transmit. In step 522 the device 104 may determine whether the length of the frame to be transmitted is below or above a threshold. If the length of the frame is less than the threshold, then, in step 524, $T_G'$ may be set to a first value. If the length of the frame is greater than the threshold, then, in step 526, $T_G'$ may be set to a second value, which may be higher than the first value.

Although FIGS. 5A-5C illustrate scenarios selecting between two values of $T_G'$, in practice values of $T_G'$ may be selected from a larger set of options such that $T_G'$ could be controlled with more granularity.

FIGS. 6A-6D depict data structures which may be utilized for implementing dynamic media access control algorithms.

Figure 6A:
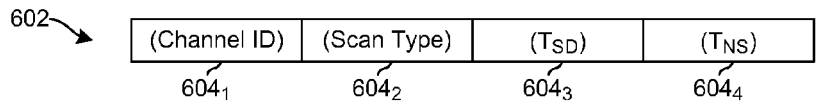
FIGS. 6A-6D depict data structures which may be utilized for implementing dynamic media access control algorithms.

Referring to FIG. 6A, there is shown a scan n-tuple (a four-tuple) 602 comprising a Channel ID field $604_1$, a scan type field $604_2$, a scan duration field $604_3$, and a time-to-next-scan field $604_4$. The Channel ID field $604_1$ may indicate a frequency and/or bandwidth of a channel on which to listen for traffic. The scan type field $604_2$ may determine the type of frame(s) to listen for (e.g., background or foreground frames). The scan duration field $604_3$ may indicate how long to listen to the channel. The time-to-next scan field $604_4$ may indicate how long to wait between listening to the channel identified in scan n-tuple 602 and listening to a channel identified in another scan n-tuple.

Figure 6B:
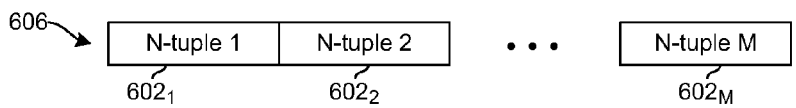

Referring to FIG. 6B, there is shown an exemplary sequence 606 of scan n-tuples $602_1$-$602_M$, where M is an integer. Each of the scan n-tuples $602_1$-$602_M$ in the sequence 606 may be as described with respect to FIG. 6A.

In operation, upon entering an idle state of operation (e.g., at a time triggered by a real-time clock), the device 104 may read the first scan n-tuple $602_1$, listen to the channel identified by field $604_1$ of scan n-tuple $602_1$ for the type of frame identified in field $604_2$ of scan n-tuple $602_1$. The device 104 may begin counting-down the amount of time in field $604_4$ while concurrently beginning listening for the amount of time in field $604_3$. After the longer of these two time fields expires, the device 104 may read the next scan n-tuple $602_2$ in the sequence 606 and operate accordingly, that is, enter a listen state followed by a wait state according to the fields of the scan n-tuple $602_2$. The device 104 may repeat this process until it has operated in accordance with each of the scan n-tuples $602_1$-$602_M$. After completing the scan described in the last n-tuple of the sequence 606, the device may return to the first n-tuple in the sequence 614.

Figure 6C:
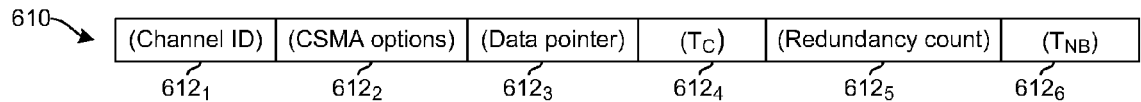

Referring to FIG. 6C, there is shown a beacon n-tuple (a six-tuple) 610 comprising a Channel ID field $612_1$, a CSMA options field $612_2$, a pointer $612_3$, a contention period duration ($T_C$) field $612_4$, a redundancy count field $612_5$, and a time-to-next-beacon field $612_5$. The Channel ID field $612_1$ may indicate a frequency and/or bandwidth of a channel on which to transmit a beacon. The CSMA options field $612_2$ may indicate if responses should utilize CSMA when responding and, if so, how they should determine parameters for performing the CSMA. The pointer field $612_3$ may point to a file or block of data that is to be transmitted as part of the beacon (e.g., transmitted as the payload of a frame). The contention period duration field $612_4$ may indicate how long the device should listen for responses to the beacon. The redundancy count field $612_5$ may indicate how many times the beacon transmission should be repeated. The time-to-next beacon field $612_6$ may indicate how long to wait between transmitting the beacon described in beacon n-tuple 610 and transmitting a beacon described in another beacon n-tuple.

Figure 6D:
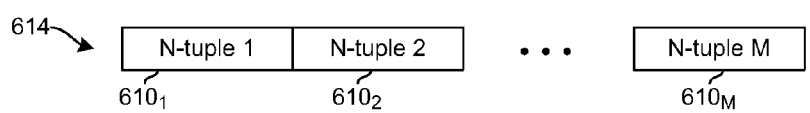

Referring to FIG. 6D, there is shown an exemplary sequence 614 of beacon n-tuples $610_1$-$610_M$, where M is an integer. Each of the beacon n-tuples in the sequence 614 may be as described with respect to FIG. 6C.

In operation, upon entering a beacon transmit state of operation (e.g., at a time triggered by a real-time clock), the device 104 may read the first beacon n-tuple $610_1$ and transmit a beacon comprising: data pointed to by field $612_3$ of n-tuple $610_1$; and fields determined by field $612_3$ of beacon n-tuple. The device may then listen for responses to the beacon for the amount of time indicated in field $612_4$ of n-tuple $610_1$. The device may repeat the beacon up to the number of times in field $612_5$ of n-tuple $610_1$ until a response is received or until the amount of time $T_{NB}$ in field $612_6$ of n-tuple $610_1$ elapses. After a response is received, or $T_{NB}$ elapses, the device 104 may read the next n-tuple $610_2$ in the sequence 614 and operate accordingly, that is, enter a transmit state followed by a listen state and/or a wait state according to the fields of the n-tuple $610_2$. The device 104 may repeat this process until it has operated in accordance with each of the n-tuples $610_1$-$610_M$. After completing beacon transmission in accordance with the last n-tuple in the sequence 614, the device may exit the beacon transmit mode of operation or may return to the first n-tuple in the sequence 614.

The n-tuples, sequences, and states of operation described with respect to FIGS. 6A-6D are only exemplary. Other implementations in which channel scan and and/or transmit operations are controlled by one or more ordered sets of parameters will be understood from the foregoing and from inspection of the above-incorporated U.S. Provisional Patent Application having Ser. No. 61/464,376.

Figure 7:
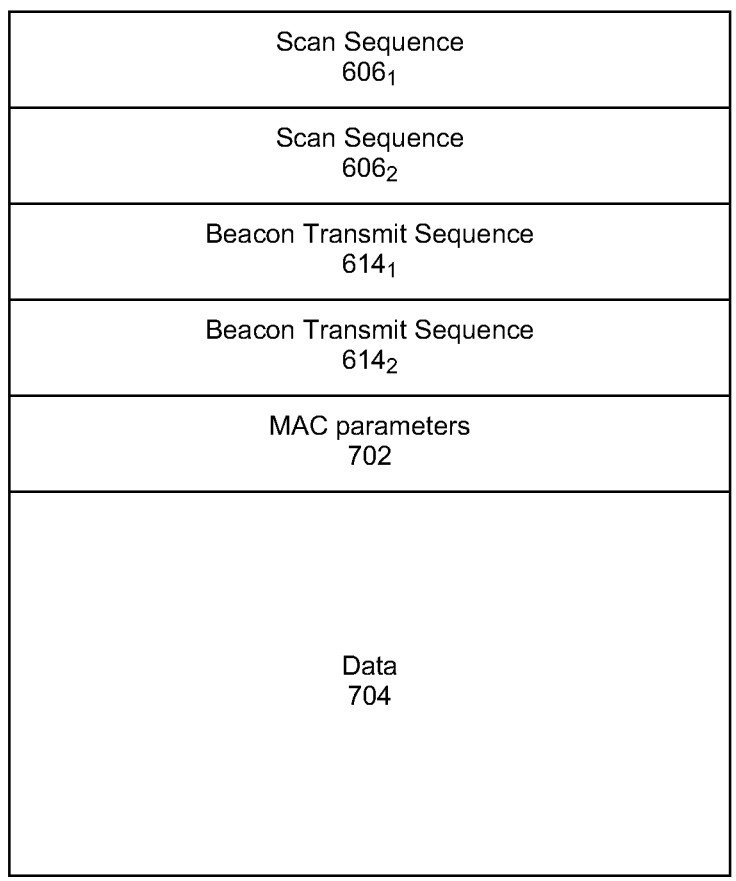
FIG. 7 depicts an exemplary file system in a device comprising a dynamically adaptable media access controller.

FIG. 7 depicts an exemplary file system in a device comprising a dynamically adaptable media access controller. The file system comprises a scan sequence $606_1$, a scan sequence $606_2$, a beacon transmit sequence $614_1$, a beacon transmit sequence $614_2$, portion 702 for storing media access control parameters, and a portion 704 for storing data. The file system may be, for example, the same as or similar to the indexed short file block (IFSB) described in the above-incorporated U.S. Provisional Patent Application having Ser. No. 61/464, 376.

The sequences $606_1$ and $606_2$ may be instances of the sequence 606 described in FIG. 6B. Which of the sequences $606_1$ and $606_2$ is utilized for scanning at any particular time may depend on a variety of factors such as, for example: where the device is located, time of day/week/month/year, type(s) of device(s) to be communicated with, number of devices to be communicated with, types of messages to be listened for, time since last transmit and/or receive activity, etc. In an exemplary embodiment, the sequence $606_1$ may be utilized when the device is in an idle state of operation and the sequence $606_2$ may be utilized when the device is in a hold state of operation. In an exemplary embodiment, the sequence $606_1$ may be utilized when the device is operating in a first location and the sequence $606_2$ may be utilized when the device is operating in a second location The sequences $614_1$ and $614_2$ may be instances of the sequence 614 described in FIG. 6D. Which of the sequences $614_1$ and $614_2$ is utilized for transmitting beacons at any particular time may depend on a variety of factors such as, for example: where the device is located, time of day/week/month/year, type(s) of device(s) to be communicated with, number of devices to be communicated with, types of data to be sent in the beacons, etc. In an exemplary embodiment, the sequence $606_1$ may be utilized when transmitting beacons intended for a first type of device and the sequence $606_2$ may be utilized when transmitting beacons intended for a second type of device. In an exemplary embodiment, the sequence $606_1$ may be utilized when transmitting beacons in a first location and the sequence $606_2$ may be utilized when transmitting beacons in a second location.

The portion 702 may store values of one or more parameters such as, for example, parameters which configure the congestion control module 230, the flow control module 232, the CSMA module 236, and/or the RSSI module 238. Such parameters may, for example, be programmed into the portion 702 by a system administrator and/or may be configured based on received request messages.

The portion 704 may store data as, for example, described with reference to the indexed short file block (ISFB), the indexed short file series block (ISFSB), and/or the generic file block (GFB) described in the above-incorporated U.S. Provisional Patent Application having Ser. No. 61/464,376.

Figure 8:
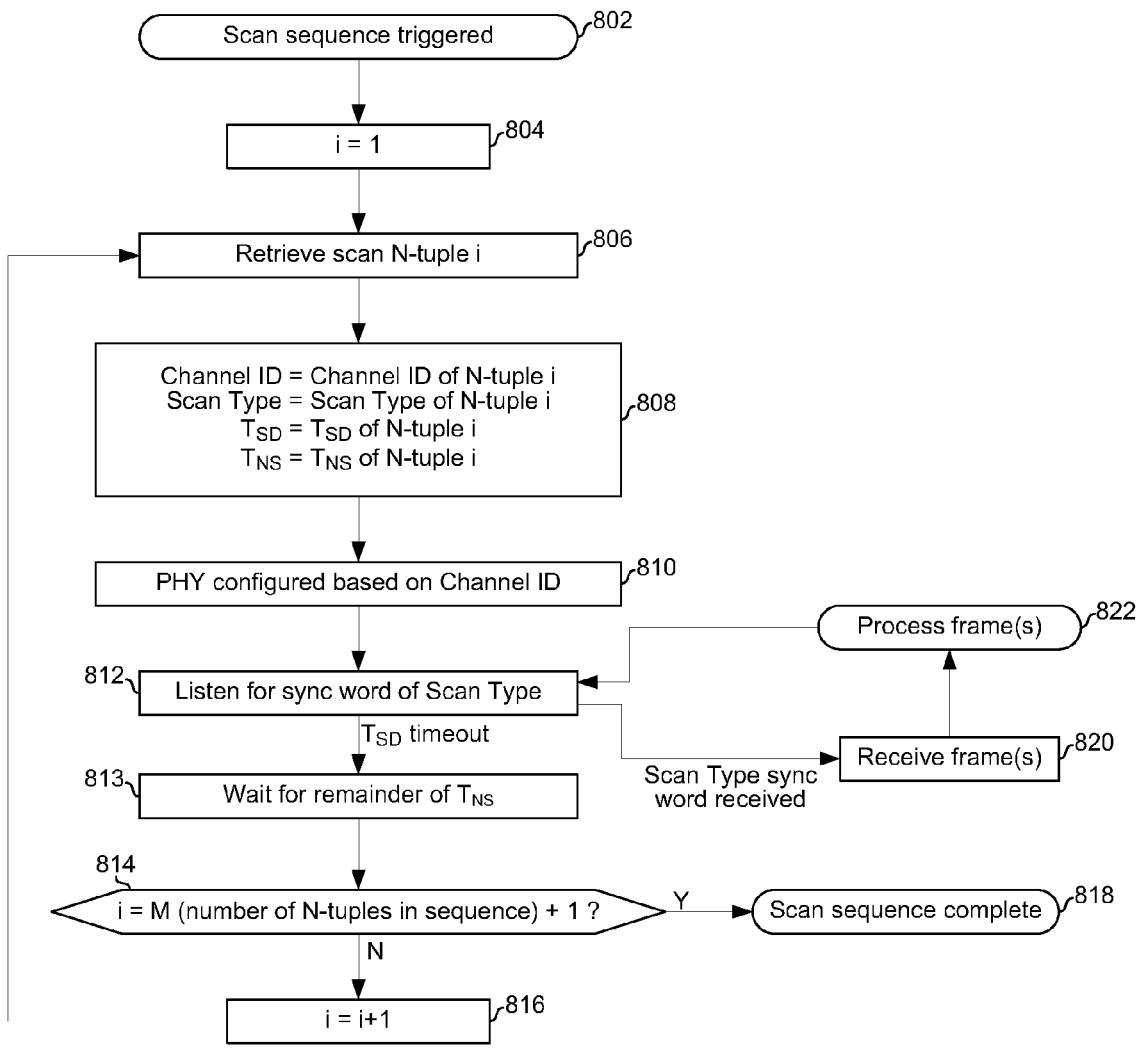
FIG. 8 is a flowchart illustrating exemplary steps for channel scanning in a device comprising a dynamically adaptable media access controller.

FIG. 8 is a flowchart illustrating exemplary steps for channel scanning in a device comprising a dynamically adaptable media access controller. The exemplary steps begin with step 802 in which a scan sequence is triggered in the device 104. The scan sequence may be triggered by, for example, a real-time clock reaching a predetermined value. In step 804, a variable i is set to 1. In step 806, the device 104 gets an n-tuple $602_i$. The n-tuple $602_i$ may be, for example, input via the programming interface 222 and/or read from the memory 216. In step 808, one or more configuration registers or variables for performing a channel scan may be set to the values in the n-tuple $602_i$. For example, the Channel ID for scan i may be set to value of the Channel ID field $604_1$ of the n-tuple $602_i$, the scan type for scan i may be set to the value of the scan type field $604_2$ of the n-tuple $602_i$, the scan duration for the scan i may be set to the value of the scan duration field $604_3$ of the n-tuple $602_i$, and the time-to-next-scan value for the scan i may be set to the value of the time-to-next scan field $604_4$ of the n-tuple $602_i$.

In step 810, the PHY of the device 104 may be configured according to the Channel ID. That is, the center frequency and bandwidth of the receiver may be configured according to the Channel ID.

In step 812, the device 104 may listen for a sync word that corresponds to the scan type of the scan i. If the scan duration elapses, and/or if the received signal strength on the channel being scanned goes below a threshold value (which may be configurable), without receiving the sync word, then in step 813 the device 104 may wait for the remainder of $T_{NS}$, which may have started counting in step 806 or 808 (e.g., if 100 milliseconds have elapsed since the n-tuple 602 was retrieved, then the device may wait for $T_{NS}$-100 ms in step 813).

In step 814 it may be determined whether i has reached a maximum value. The maximum value of i may be, for example, M+1 (where M is the number of n-tuples in the sequence 606). If i has not reached its maximum value, then, in step 816, i may be incremented and the steps may return to step 806.

Returning to step 814, if i has reached its maximum value, then in step 818 the scan sequence may be complete. Upon completing the scan sequence, the device 104 may, for example, begin a new scan sequence, begin a beacon transmit sequence, or go into a sleep mode.

Returning to step 812, if a sync word of the type being listened for is received before the scan duration times out, then in step 820 the device 104 will receive one or more frames and, in step 822, process the received frame(s). If in step 822 one or more of the received frames are dropped during MAC filtering, step 812 may be resumed.

Figure 9:
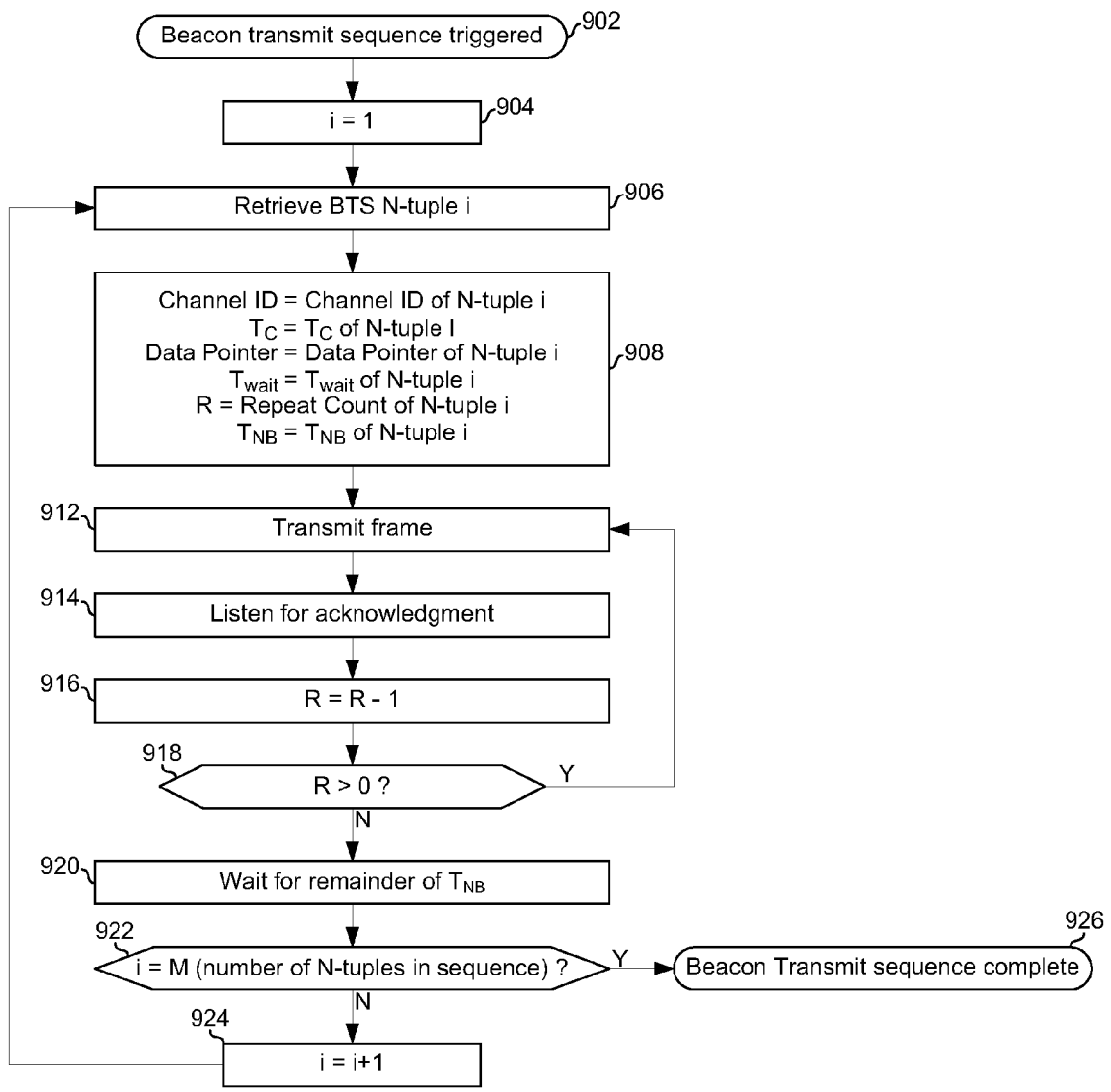
FIG. 9 is a flowchart illustrating exemplary steps for beacon transmission by a device comprising a dynamically adaptable media access controller.

FIG. 9 is a flowchart illustrating exemplary steps for beacon transmission by a device comprising a dynamically adaptable media access controller. The exemplary steps begin with step 902 in which a beacon transmit sequence is triggered in the device 104. The scan sequence may be triggered by, for example, a real-time clock reaching a predetermined value. In step 904, a variable i is set to 1. In step 906, the device 104 gets an n-tuple $610_i$. The n-tuple $610_i$ may be, for example, input via the programming interface 222 and/or read from the memory 216. In step 908, one or configuration registers or variables for performing a channel scan may be set to the values in the n-tuple $610_i$. For example, the Channel ID for beacon i may be set to value of the Channel ID field $612_1$ of the n-tuple $610_i$; CSMA options for responses to beacon i may be set to the CSMA options field $612_2$ of the n-tuple $610_i$; the data transmitted in beacon i may be the data pointed to by the pointer field $612_3$ of the n-tuple $610_i$; the amount of time the device 104 listens for responses to beacon i may be the value in the contention period duration ($T_C$) field $612_4$ of the n-tuple $610_i$; R, the maximum number of times that the device 104 repeats transmission of the beacon i, may be set to the value of the redundancy count field $612_5$ of the n-tuple $610_i$; and $T_{NB}$, the time at which the device 104 transmits beacon i+1 may be set to the value of the time-to-next-beacon field $612_5$ of the n-tuple $610_i$. In step 912, the beacon i is transmitted onto the physical medium. In step 914, the device 104 may listen for a response for up to $T_C$. In step 916, the value R may be decremented by 1 and, in step 918, if R is greater than zero, then the steps may return to step 912.

Returning to step 918, if R is less than or equal to zero, then in step 920 the device may wait for the remainder of $T_{NB}$, which may have started counting in step 906 or 908 (e.g., if 100 milliseconds have elapsed since the n-tuple $602_i$ was retrieved, then the device may wait for $T_{NB}$-100 ms in step 920). In step 922, it may be determined whether i has reached a maximum value. The maximum value of i may be, for example, the number of n-tuples in a sequence 614. If i has not reached its maximum value and no acknowledgement was detected in step 914, then, in step 924, i may be incremented and the steps may return to step 906.

Returning to step 922, if i has reached its maximum value, then in step 926 the beacon transmit sequence may be complete. Upon completing the beacon transmit sequence, the device 104 may, for example, begin a new beacon transmit sequence, begin a scan sequence, or go into a sleep mode.

Figure 10A:
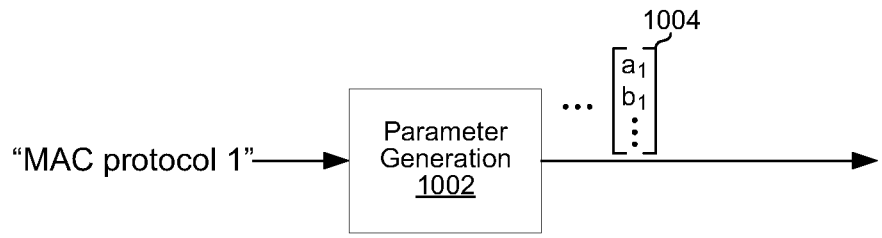
FIGS. 10A-10C illustrate generation of parameters utilized by a dynamically adaptable media access controller.
Figure 10B:
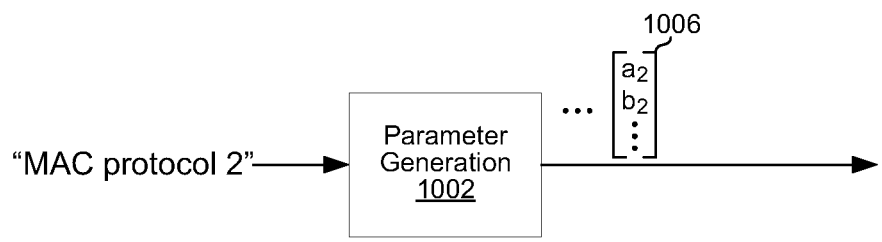
Figure 10C:
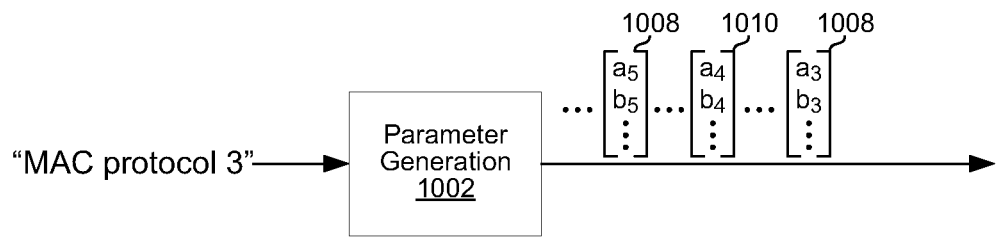

FIGS. 10A-10C illustrate generation of parameters utilized by a dynamically adaptable media access controller. A device, such as device 104, may comprise a parameter generation module 1002 which may be operable to configuring media access control in the device 104 based on a high-level input from, for example, an application or operating system of the device 104 (e.g., via an application programming interface).

Referring to FIG. 10A, in response to a request to implement a first MAC protocol, the parameter generation module 1002 generates a set of parameter values 1004 which may be utilized by, for example, the congestion control module 232, the flow control module 234, and/or the CSMA module 236.

Referring to FIG. 10B, in response to a request to implement a second MAC protocol, the parameter generation module 1002 generates a set of parameter values 1006 which may be utilized by, for example, the congestion control module 232, the flow control module 234, and/or the CSMA module 236.

In FIGS. 10A and 10B, the parameter values to realize the first and second MAC protocols were static. Some MAC protocols, however, may require the periodic or continual (e.g., at or near real-time) updating of values of the parameters. For example, in FIG. 10C, a third MAC protocol is implemented by alternating between a set of parameter values 1008 and a set of parameter values 1010.

Thus, as illustrated in FIGS. 10A-10C, a variety of time and/or frequency division multiple access protocols may be implemented in the device 104 simply through intelligent control of one or more parameter values. Such protocols could include, for example, media access control utilized in IEEE 802.11 and IEEE 802.15.4.

FIG. 11A illustrates the structure of an exemplary physical layer frame containing a first type of data link layer protocol data unit (PDU). The physical layer frame comprises a preamble, a sync word, and a payload. The payload comprises a data link layer (OSI layer 2) PDU, in this case, a background frame. The background frame comprises a subnet field, a background protocol ID (BPID) field, and CRC field. The payload comprises a background protocol ID (BPID) field and protocol data. The protocol data comprises a channel ID field and an estimated time of arrival (ETA) field if the background protocol is the advertising protocol. The protocol data comprises a reservation type field and a reservation duration field if the background protocol is the reservation protocol.

Figure 11B:
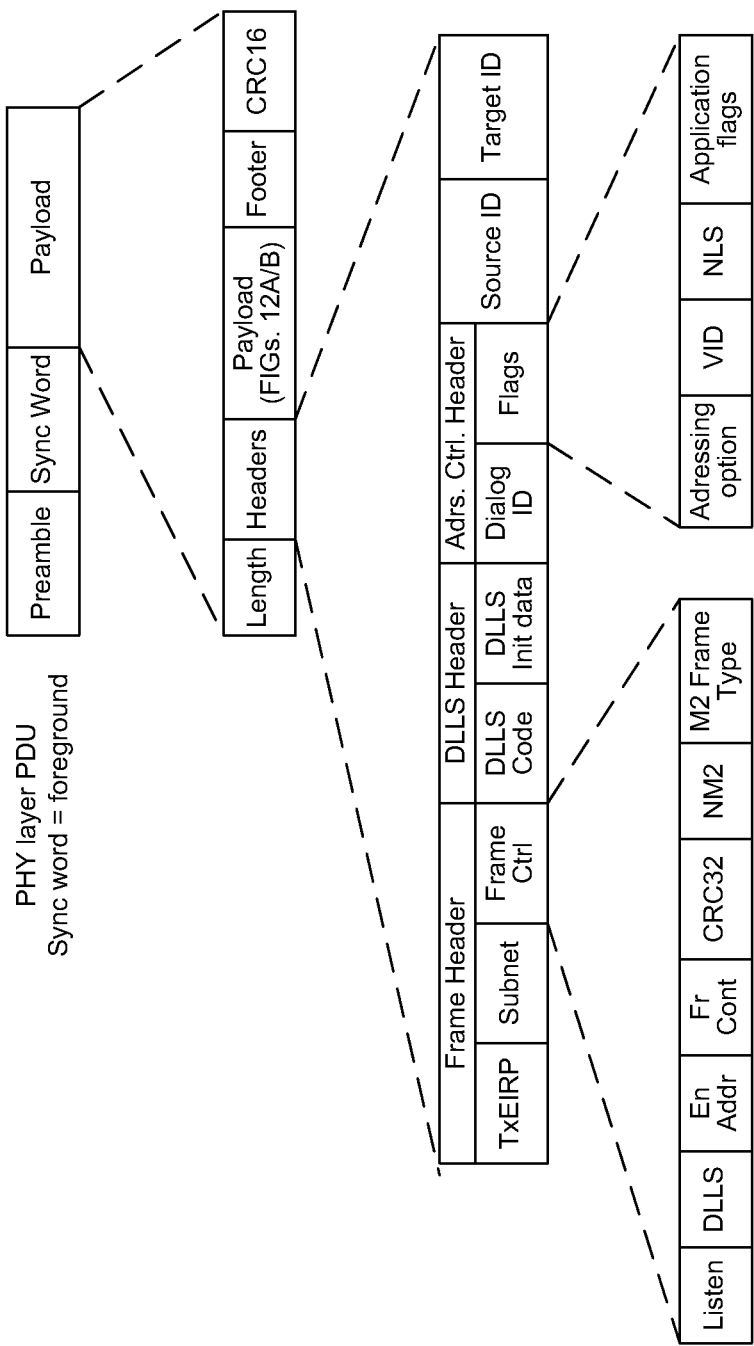
FIG. 11B illustrates the structure of an exemplary physical layer frame containing a second type of data link layer protocol data unit (PDU).

FIG. 11B illustrates the structure of an exemplary physical layer frame containing a second type of data link layer protocol data unit (PDU). The physical layer frame comprises a preamble, a sync word, and a payload. The payload comprises a data link layer (OSI layer 2) PDU, in this case, a foreground frame. The foreground frame comprises a length field, a headers field, a payload, a footer, and a cyclic redundancy check field. The payload may comprise a network layer (OSI layer 3) PDU. The headers field comprises TxEIRP field, a subnet field, a frame control field, a data link layer security (DLLS) code, DLLS initialization data, a dialog identifier, a flags field, a source ID, and a target ID. The frame control field comprises a listen flag, a DLLS flag, an enable addressing flag, a frame continuity flag, a CRC32 flag, a not mode 2 flag, and a mode 2 frame type flag. The flags field comprises an addressing option flag, a virtual ID flag, a network layer security flag, and application flags.

Figure 12A:
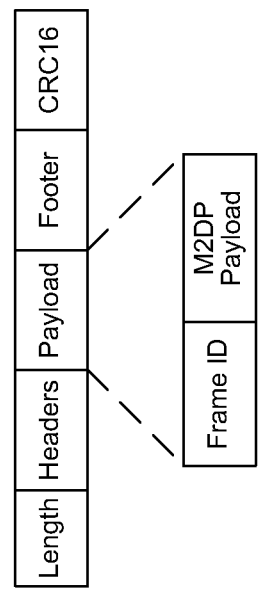
FIGS. 12A illustrates the structure of an exemplary first type of network-layer PDU.

FIGS. 12A illustrates the structure of an exemplary first type of network-layer PDU. In FIG. 12A, the enable addressing field of the layer 2 PDU indicates that the PDU contained in the payload of the layer 2 PDU is a mode 2 datastream protocol (M2DP) PDU. Specifically, the payload of the layer 2 PDU comprises a frame ID field and a M2DP payload.

Figure 12B:
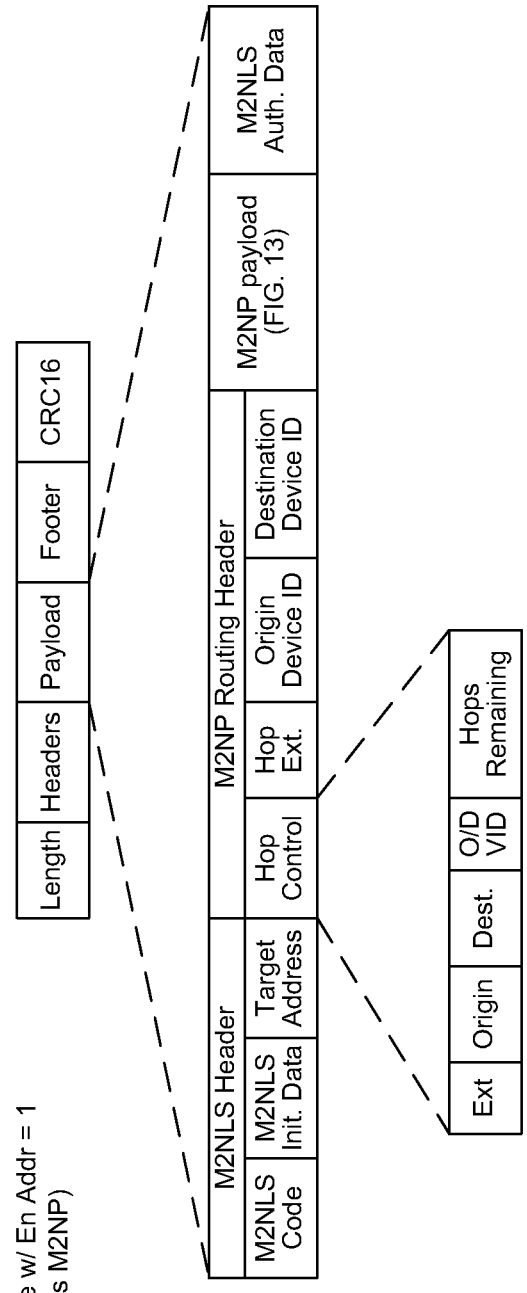
FIGS. 12B illustrates the structure of an exemplary second type of network-layer PDU.

FIGS. 12B illustrates the structure of an exemplary second type of network layer PDU. In FIG. 12B, the enable addressing field of the layer 2 PDU indicates that the PDU contained in the payload of the layer 2 PDU is a mode 2 network protocol (M2NP) PDU. Specifically, the payload of the layer 2 PDU comprises a mode 2 network layer security (M2NLS) code, M2NLS initialization data, a target address, a hop control field, a hop extension field, an origin device ID, a destination device ID, a M2NP payload, and M2NP authentication data. The M2NP payload may contain a layer 4 PDU. The hop control field comprises hop extension flag, an Origin ID flag, a Destination ID flag, origin/destination virtual ID flag, and a hops remaining field.

Figure 13:
FIG. 13 depicts the structure of an exemplary transport-layer PDU.

FIG. 13 depicts the structure of an exemplary transport-layer PDU. The transport protocol associated with the PDU in FIG. 13 is the mode 2 query protocol (M2QP). The M2QP PDU ("command") comprises a command code field, a command control field, and may comprise one or more of a dialog template, an ack template, a global query template, a local query template, an error template, and a command data template. The command code field comprises an extension flag, a command type field, and an M2QP opcode. The command extension field comprises a collision avoidance (CA) type field, a no CSMA flag, and a no response flag. The structures of the various templates are described with respect to FIGS. 14A-14E.

FIGS. 14A-14E depict the structure of exemplary portions of a transport-layer PDU. In FIG. 14A, the dialog template comprises a response timeout field, a response channel list length field, and a response channel list. In FIG. 14B, the ack template comprises a number of ack fields and an ack device IDs field. In FIG. 14C, the query template comprises a compare length field, a compare code field, a compare mask field, and a compare value field. The compare code field may comprise a mask enable flag, a comparison type field, and a comparison parameters field. In FIG. 14D, the error template comprises an error code field, an error subcode field, an M2QP error data field, and an extended error data field. In FIG. 14E, the command data template comprises one or more of a comparison template, a call template, a return template, and command-specific data which is the data indicated by the one or more present comparison, call, and/or return templates. The various templates of the command data template are described below with respect to FIGS. 15A-15F.

FIGS. 15A-15F depict the structure of exemplary portions of a transport-layer PDU. In FIG. 15A, for an M2QP opcode that indicates file, the comparison template comprises a comparison file ID and a comparison byte offset. In FIG. 15B, for an M2QP opcode that indicates series, the comparison template comprises a comparison series ID and a comparison byte offset. In FIG. 15C, for an M2QP opcode that indicates file, the call template comprises a max returned bytes field, a return file ID, and a return file entry offset. In FIG. 15D, for an M2QP opcode that indicates series, the call template comprises a max returned bytes field, a series ID, and a file series data offset. In FIG. 15E, for an M2QP opcode that indicates file, the return template comprises a return file ID, a file offset, an IFSB total length, and file data. In FIG. 15F, for an M2QP opcode that indicates series, the return template comprises a series ID, a series length, a file series data offset, a file series total data length, one or more file IDs, one or more file lengths, and a file series data starting offset.

Additional details of the frames and fields described above with respect to FIGS. 11A-15F are described in the above-incorporated U.S. Provisional Patent Application having Ser. No. 61/464,376.

In accordance with various aspects of the present invention, an electronic device 104 may be operable to control access to a physical medium (e.g., airwaves, a copper cable, or an optical fiber) utilizing carrier sense multiple access (CSMA). The amount of time that the electronic device 104 must sense the physical medium as being inactive before it permits transmission of a message onto the physical medium may be determined based on: the size of the message, the type of the message, the symbol rate at which the message is to be transmitted, and/or a channel onto which the message is to be transmitted. Similarly, how long and/or how many times the electronic device attempts to transmit the message may be based the size of the message, the type of the message, the symbol rate at which the message is to be transmitted, and/or a channel onto which the message is to be transmitted.

The message may be in response to a request received by the electronic device via the physical medium, and the channel onto which the message is to be transmitted may be determined based on a field (e.g., Response Channel List) of the received request. The field of the received request may comprises a list of channels, and the electronic device 104 may sequentially listen to channels in the list until a channel meeting certain requirements (e.g., signal strength below a threshold for at least a period of time $T_G'$) is found or until a timeout occurs (e.g., $T_{CA}$ has elapsed since a CSMA process was initiated or $T_C$ has elapsed since the request was sent). The maximum amount of time that the electronic device 104 attempts to transmit the message onto the physical medium may be determined based on a field (e.g., Response timeout) of the received request message. While the message is pending transmission, a portion of the electronic device 104 may alternate between a listen state and a wait state, wherein the amount of time in one or both of the listen state and the wait state may be determined based on one or more fields (e.g., Response timeout and/or CA type) of the received request. Additionally or alternatively, the one or more fields of the received request may determine an equation and/or algorithm utilized by the electronic device for the determining the amount of time spent in one or both of the listen state and the wait state.

The electronic device 104 may comprise memory and a receiver and may be operable to: read a series of n-tuples from the memory, each of the n-tuple comprising a channel identifier, a scan duration value, and a time-to-next-scan value. For each of the read n-tuples, the device 104 may be operable to: configure the receiver to receive on the channel associated with the channel identifier for an amount of time equal to the scan duration value; and power-down the receiver for an amount of time equal to the time-to-next-scan value minus the scan duration value.

The electronic device 104 may comprise a memory, a transmitter, and a receiver and may be operable to read a series of n-tuples from the memory, each of the n-tuple comprising a channel identifier, a contention period value, and a time-to-next-scan value. For each of the read n-tuples, the device 104 may be operable to: configure the transmitter to transmit a beacon on the channel associated with the channel identifier; configure the receiver to listen for a response to the beacon for an amount of time equal to the contention period value; and wait a period of time equal to the time-to-next-scan value minus the contention period value before operating based on the next n-tuple in the series of n-tuples.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for dynamic media access control in a multiple access system.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
an electronic device operable to control access to a physical medium utilizing carrier sense multiple access (CSMA), wherein the amount of time that said electronic device must sense said physical medium as being inactive before said electronic device permits transmission onto said physical medium is dynamically determined based on:
the size of any given message to be transmitted, such that said amount of time is a first amount for a first message of a first size and a second amount for a second message of a second size; and
one or more other parameters, the one or more other parameters comprising at least one parameter relating to characteristics of the message that is to be transmitted, other than message size, or to characteristics of a channel onto which the message is to be transmitted, other than channel quality; and
wherein said electronic device comprises memory and a receiver, and said electronic device is operable to:
read a series of n-tuples from said memory, each of said n-tuple comprising a channel identifier, a scan duration value, and a time-to-next-scan value; and
for each of said read n-tuples:
configure said receiver to receive on the channel associated with said channel identifier for an amount of time equal to said scan duration value; and
power-down said receiver for an amount of time equal to said time-to-next-scan value minus said scan duration value.

2. The system of claim 1, wherein said amount of time that said electronic device must sense said physical medium as being inactive before said electronic device permits transmission of said message onto said physical medium is determined based on a type of said message.

3. The system of claim 1, wherein said amount of time that said electronic device must sense said physical medium as being inactive before said electronic device permits transmission of said message onto said physical medium is determined based on a symbol rate at which said message is to be transmitted.

4. The system of claim 1, wherein said amount of time that said electronic device must sense said physical medium as being inactive before said electronic device permits transmission of said message onto said physical medium is determined based on a channel onto which said message is to be transmitted.

5. The system of claim 1, wherein:
said message is in response to a request received by said electronic device via said physical medium; and
said channel onto which said message is to be transmitted is determined based on a field of said received request.

6. The system of claim 5, wherein:
said field of said received request comprises a list of channels;
said electronic device sequentially listen to channels in said list of channels until a channel meeting certain requirements is found or until a timeout occurs.

7. The system of claim 1, wherein:
said message is in response to a request received via said physical medium by said electronic device; and
the maximum amount of time that said electronic device attempts to transmit said message onto said physical medium is determined based on a field of said previously-received request message.

8. The system of claim 1, wherein:
said message is in response to a request received via said physical medium by said electronic device; and
while said message is pending transmission, a portion of said electronic device alternates between a listen state and a wait state, wherein the amount of time that said portion of said electronic device spends in one or both of said listen state and said wait state is determined based on one or more fields of said received request.

9. The system of claim 8, wherein said one or more fields of said received request determine an equation and/or algorithm utilized by said electronic device for said determining said amount of time that said portion of said electronic device spends in one or both of said listen state and said wait state.

10. A system comprising:
an electronic device comprising memory, a transmitter, and a receiver, wherein said electronic device is operable to:
read a series of n-tuples from said memory, each of said n-tuple comprising a channel identifier, a contention period value, and a time-to-next-scan value; and
for each of said read n-tuples:
configure said transmitter to transmit a beacon on the channel associated with said channel identifier;

configure said receiver to listen for a response to said beacon for an amount of time equal to said contention period value; and wait a period of time equal to said time-to-next-scan value minus said contention period value before operating based on the next n-tuple in said series of n-tuples.

11. A method comprising:

in an electronic device which utilizes carrier sense multiple access (CSMA) for communicating over a physical medium:

dynamically determining the amount of time that said electronic device must sense said physical medium as being inactive before permitting transmission of onto said physical medium based on:

the size of any given message to be transmitted, such that said amount of time is a first amount for a first message of a first size and a second amount for a second message of a second size; and one or more other parameters, the one or more other parameters comprising at least one parameter relating to characteristics of the message that is to be transmitted, other than message size, or to characteristics of a channel onto which the message is to be transmitted, other than channel quality; and reading a series of n-tuples from memory, each of said n-tuple comprising a channel identifier, a scan duration value, and a time-to-next-scan value;

for each of said read n-tuples:

configuring said receiver to receive on the channel associated with said channel identifier for an amount of time equal to said scan duration value; and powering-down said receiver for an amount of time equal to said time-to-next-scan value.

12. The method of claim 11, wherein said determining said amount of time that said electronic device must sense said physical medium as being inactive before said electronic device permits transmission of said message onto said physical medium is based on a type of said message.

13. The method of claim 11, wherein said determining said amount of time that said electronic device must sense said physical medium as being inactive before said electronic device permits transmission of said message onto said physical medium is based on a symbol rate at which said message is to be transmitted.

14. The method of claim 11, wherein said determining said amount of time that said electronic device must sense said physical medium as being inactive before said electronic device permits transmission of said message onto said physical medium is based on a channel onto which said message is to be transmitted.

15. The method of claim 11, wherein:

said message is in response to a request received by said electronic device via said physical medium; and said channel onto which said message is to be transmitted is determined based on a field of said received request.

16. The method of claim 15, wherein:

said field of said received request comprises a list of channels;

said electronic device sequentially listen to channels in said list of channels until a channel meeting certain requirements is found or until a timeout occurs.

17. The method of claim 11, wherein:

said message is in response to a request received via said physical medium by said electronic device; and the maximum amount of time that said electronic device attempts to transmit said message onto said physical medium is determined based on a field of said previously-received request message.

18. The method of claim 11, wherein:

said message is in response to a request received via said physical medium by said electronic device; and while said message is pending transmission, a portion of said electronic device alternates between a listen state and a wait state, wherein the amount of time that said portion of said electronic device spends in one or both of said listen state and said wait state is determined based on one or more fields of said received request.

19. The method of claim 18, wherein said one or more fields of said received request determine an equation and/or algorithm utilized by said electronic device for said determining said amount of time that said portion of said electronic device spends in one or both of said listen state and said wait state.

20. A method comprising:

in an electronic device which utilizes carrier sense multiple access (CSMA) for communicating over a physical medium:

dynamically determining the amount of time that said electronic device must sense said physical medium as being inactive before permitting transmission of onto said physical medium based on:

the size of any given message to be transmitted, such that said amount of time is a first amount for a first message of a first size and a second amount for a second message of a second size; and one or more other parameters, the one or more other parameters comprising at least one parameter relating to characteristics of the message that is to be transmitted, other than message size, or to characteristics of a channel onto which the message is to be transmitted, other than channel quality;

reading a series of n-tuples from said memory, each of said n-tuple comprising a channel identifier, a contention period value, and a time-to-next-scan value; and for each of said read n-tuples:

configuring said transmitter to transmit a beacon on the channel associated with said channel identifier;

configuring said receiver to listen for a response to said beacon for an amount of time equal to said contention period value; and waiting a period of time equal to said time-to-next-scan value minus said contention period value before operating based on the next n-tuple in said series of n-tuples.

21. The method of claim 20, wherein said determining said amount of time that said electronic device must sense said physical medium as being inactive before said electronic device permits transmission of said message onto said physical medium is based on a type of said message.

22. The method of claim 20, wherein said determining said amount of time that said electronic device must sense said physical medium as being inactive before said electronic device permits transmission of said message onto said physical medium is based on a symbol rate at which said message is to be transmitted.

23. The method of claim 20, wherein said determining said amount of time that said electronic device must sense said physical medium as being inactive before said electronic device permits transmission of said message onto said physical medium is based on a channel onto which said message is to be transmitted.

24. The method of claim 20, wherein:
said message is in response to a request received by said electronic device via said physical medium; and
said channel onto which said message is to be transmitted is determined based on a field of said received request.

25. The method of claim 24, wherein:
said field of said received request comprises a list of channels;
said electronic device sequentially listen to channels in said list of channels until a channel meeting certain requirements is found or until a timeout occurs.

26. The method of claim 20, wherein:
said message is in response to a request received via said physical medium by said electronic device; and
the maximum amount of time that said electronic device attempts to transmit said message onto said physical medium is determined based on a field of said previously-received request message.

27. The method of claim 20, wherein:
said message is in response to a request received via said physical medium by said electronic device; and
while said message is pending transmission, a portion of said electronic device alternates between a listen state and a wait state, wherein the amount of time that said portion of said electronic device spends in one or both of said listen state and said wait state is determined based on one or more fields of said received request.

28. The method of claim 27, wherein said one or more fields of said received request determine an equation and/or algorithm utilized by said electronic device for said determining said amount of time that said portion of said electronic device spends in one or both of said listen state and said wait state.

* * * * *